(12) United States Patent
Burchett

(10) Patent No.: US 12,060,127 B2
(45) Date of Patent: Aug. 13, 2024

(54) STACKABLE BASE VEHICLE

(71) Applicant: Volvo Truck Corporation, Gothenburg (SE)

(72) Inventor: Chad Burchett, Browns Summit, NC (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/275,703

(22) PCT Filed: Feb. 9, 2021

(86) PCT No.: PCT/US2021/017164
§ 371 (c)(1),
(2) Date: Aug. 3, 2023

(87) PCT Pub. No.: WO2022/173413
PCT Pub. Date: Aug. 18, 2022

(65) Prior Publication Data
US 2024/0101203 A1 Mar. 28, 2024

(51) Int. Cl.
| | |
|---|---|
| *B62D 63/02* | (2006.01) |
| *B60P 3/07* | (2006.01) |
| *B62D 21/20* | (2006.01) |
| *B60D 1/145* | (2006.01) |

(Continued)

(52) U.S. Cl.
CPC ............. *B62D 63/025* (2013.01); *B60P 3/07* (2013.01); *B62D 21/20* (2013.01); *B60D 1/145* (2013.01); *B60P 1/649* (2013.01); *B62D 33/077* (2013.01)

(58) Field of Classification Search
CPC ................................. B60P 3/07; B62D 63/025
See application file for complete search history.

(56) References Cited

U.S. PATENT DOCUMENTS

| | | |
|---|---|---|
| 2,001,619 A | 5/1935 | Levoyer |
| 2,653,049 A | 9/1953 | Mettetal, Jr. |
| 3,718,346 A | 2/1973 | Self et al. |

(Continued)

FOREIGN PATENT DOCUMENTS

DE   102015010749 A1   3/2016

OTHER PUBLICATIONS

International Search Report and Written Opinion for International Patent Application No. PCT/US2021/017164, mailed Apr. 20, 2021, 12 pages.

*Primary Examiner* — Kevin Hurley
(74) *Attorney, Agent, or Firm* — Withrow & Terranova, PLLC

(57) ABSTRACT

Aspects of the disclosure relate to a base vehicle, including a base vehicle chassis, an upper mount assembly including at least one mounting rail attached to a top of a frame rail of the base vehicle chassis, and a lower mount assembly including at least one mounting bracket attached to a bottom of the base vehicle chassis. The at least one mounting bracket is moveable between a retracted position proximate to the frame rail and an extended position distal from the frame rail. The at least one mounting rail is configured to receive at least one mounting bracket of an upper vehicle to mount the upper vehicle on top of the base vehicle. The at least one mounting bracket is configured to attach to at least one mounting rail of a lower vehicle to mount the base vehicle on top of the lower vehicle.

20 Claims, 15 Drawing Sheets

(51) Int. Cl.
  *B60P 1/64* (2006.01)
  *B62D 33/077* (2006.01)

(56) References Cited

U.S. PATENT DOCUMENTS

| | | |
|---|---|---|
| 4,611,962 A | 9/1986 | Braly et al. |
| 5,492,402 A | 2/1996 | Alton |
| 5,934,695 A | 8/1999 | Rowland |
| 6,241,438 B1 * | 6/2001 | Corbett .................... B60P 3/08 410/56 |
| 6,729,817 B1 * | 5/2004 | Fennell ................. B65D 90/18 280/423.1 |
| 9,897,268 B2 * | 2/2018 | Kennedy ................. F21L 13/00 |
| 10,618,446 B2 * | 4/2020 | Kennedy ............... E04H 12/182 |
| 2002/0110442 A1 | 8/2002 | Hurlburt |
| 2006/0171791 A1 | 8/2006 | Nichols |
| 2006/0269379 A1 * | 11/2006 | Orr .......................... B60P 3/08 410/46 |
| 2009/0278326 A1 | 11/2009 | Rowland et al. |
| 2018/0029656 A1 | 2/2018 | Barnes |

\* cited by examiner

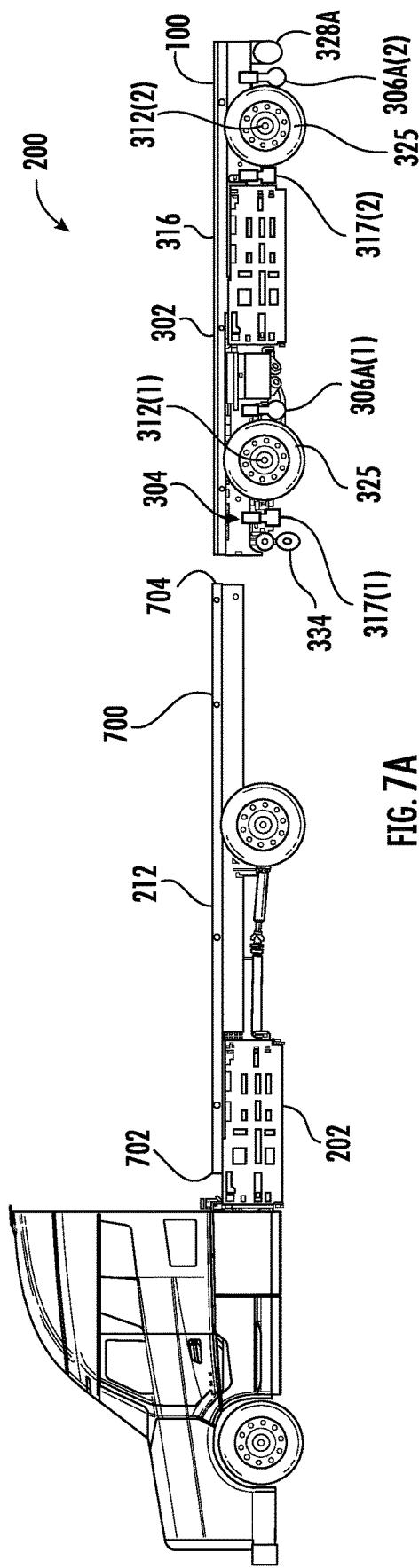
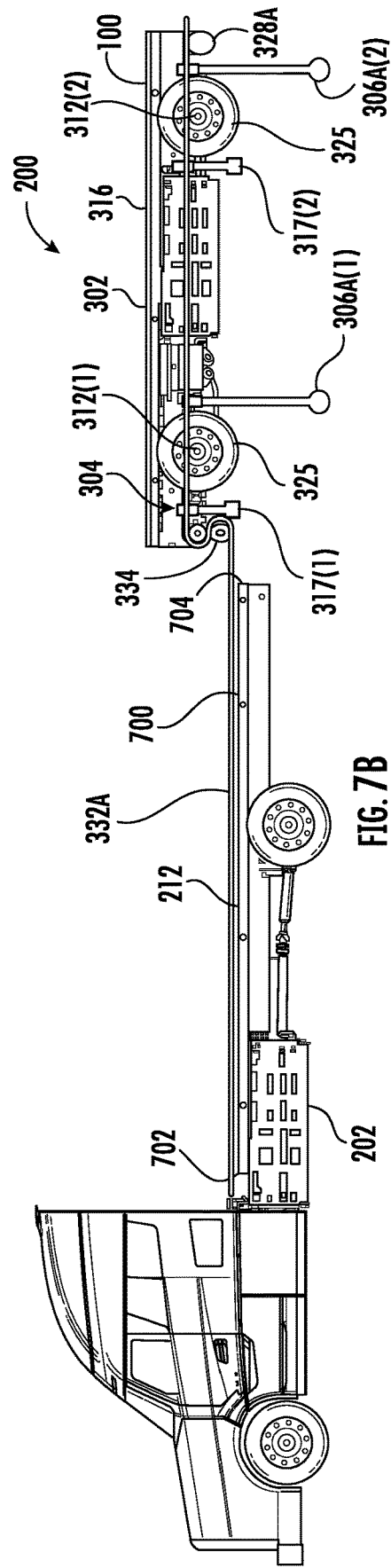
FIG. 7A
FIG. 7B

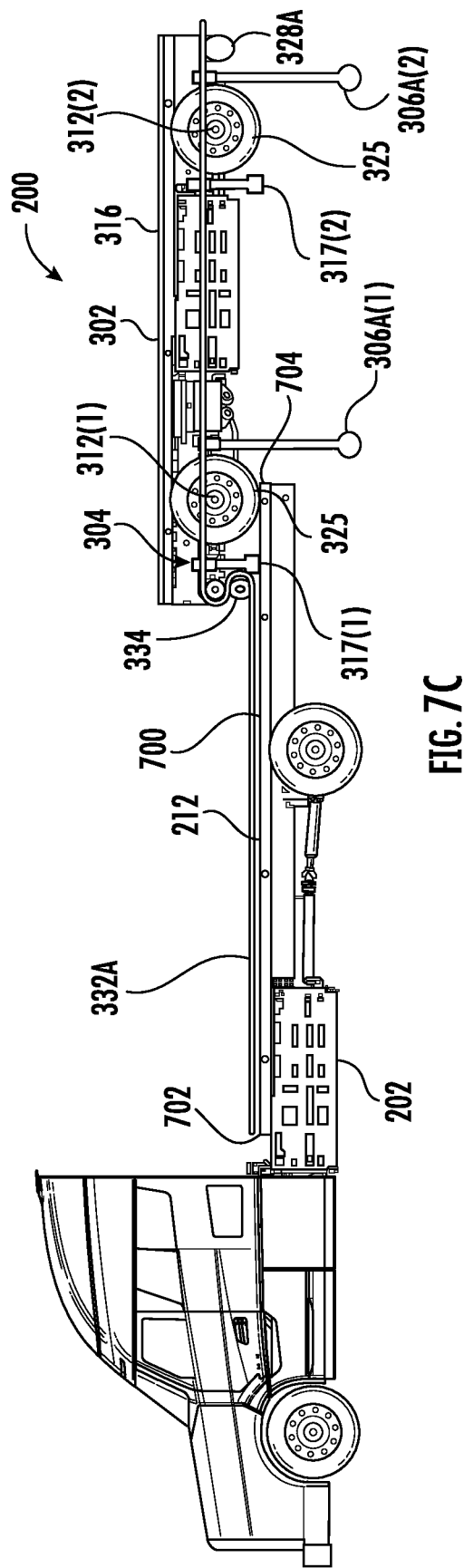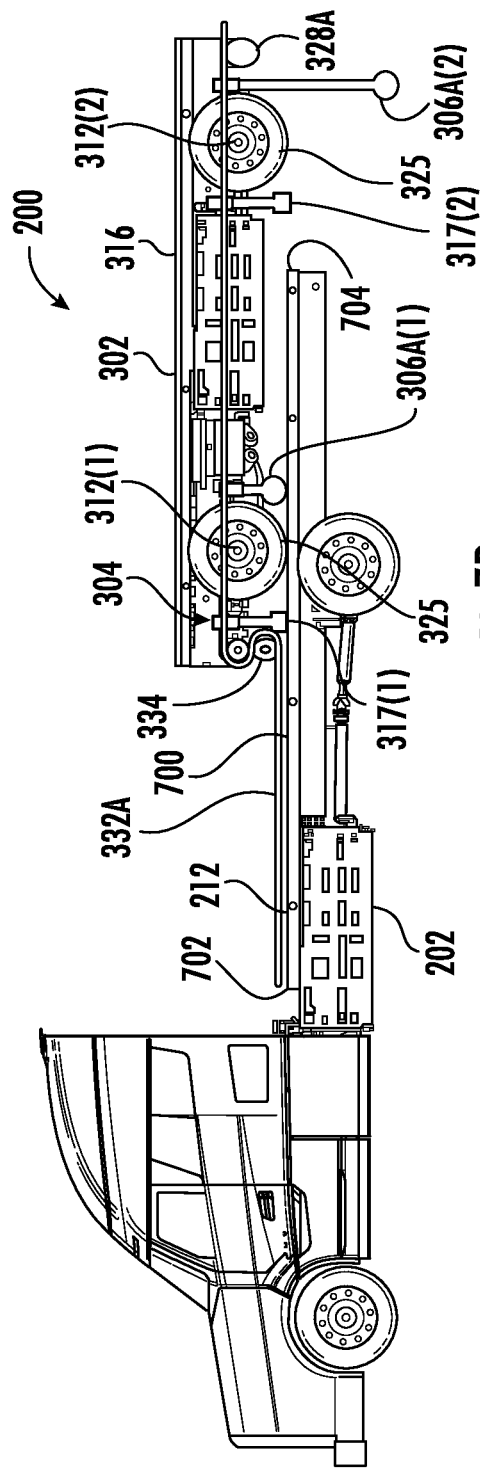

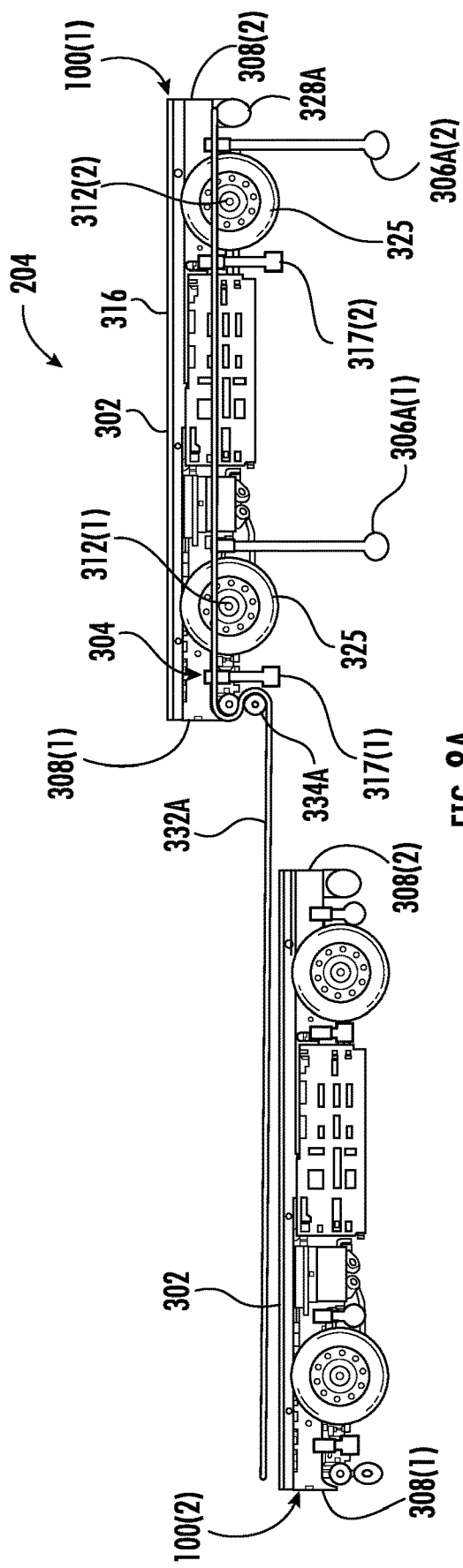
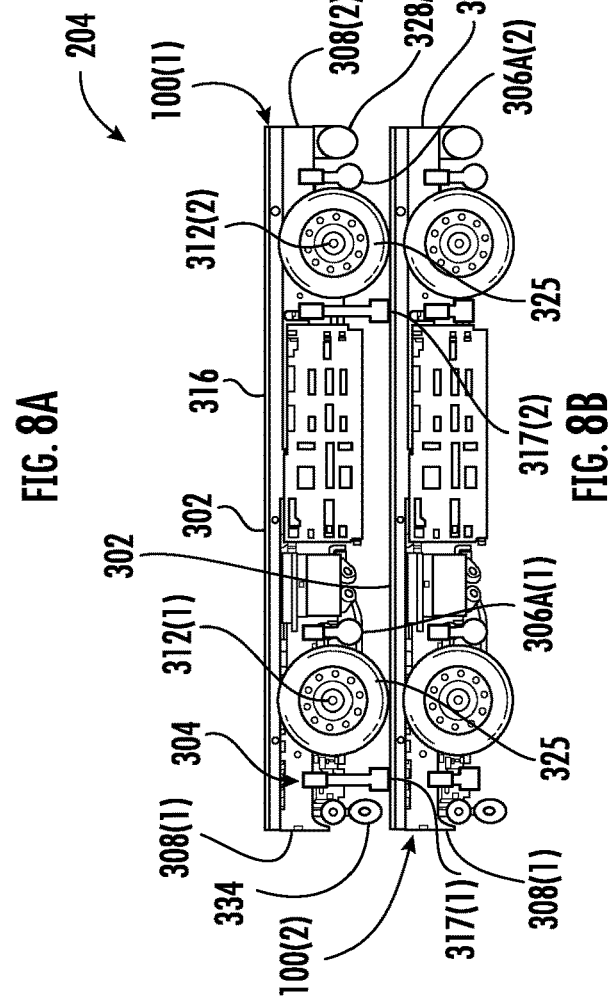
FIG. 8A
FIG. 8B

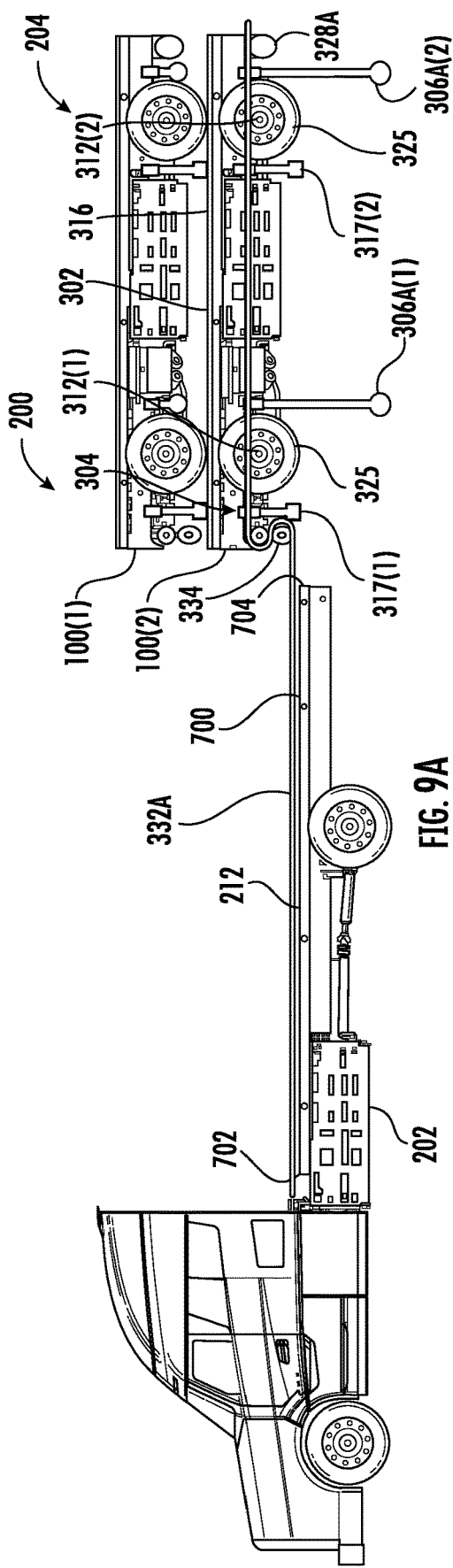
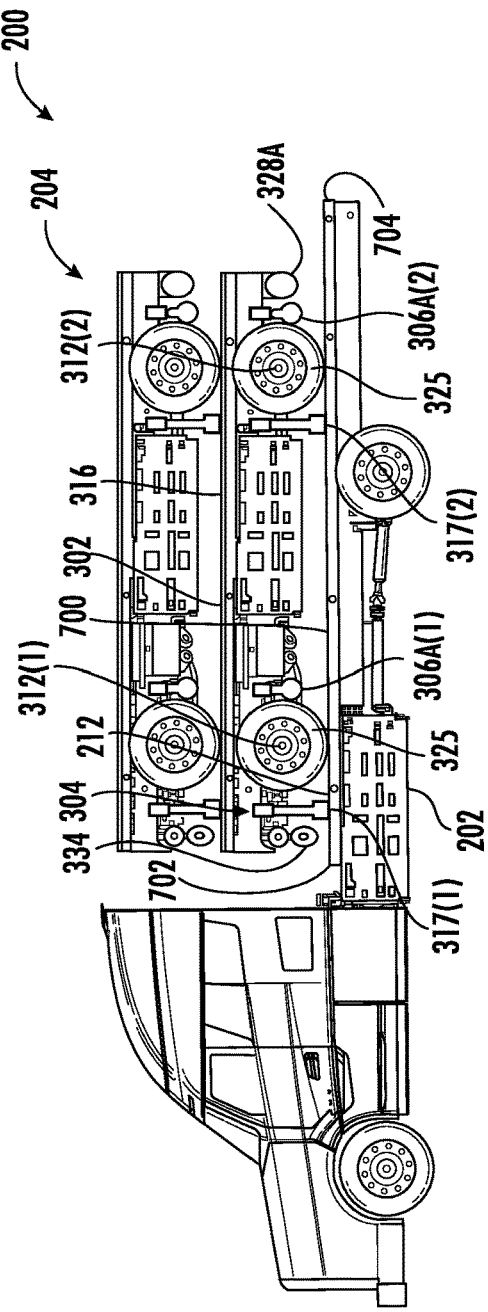

STACKABLE BASE VEHICLE

This application is a 35 USC 371 national phase filing of International Application No. PCT/US2021/017164, filed Feb. 9, 2021, the disclosure of which is incorporated herein by reference in its entirety.

FIELD OF THE DISCLOSURE

The disclosure relates generally to vehicles. In particular aspects, the disclosure relates to a stackable base vehicle with upper and lower mount assemblies.

BACKGROUND

Worksites (e.g., construction sites) often require a variety of different types of trucks at various times. For example, worksites may require a concrete mixer truck, concrete pumper truck, dump truck, and/or refuse truck. Each truck has a base with a designated body, where the truck may provide the necessary power to operate the machinery (e.g., pump) associated with the designated body. Such a configuration requires fixation of the truck at a particular location within the worksite to operate the body, which constrains infrastructure within the worksite and between different work sites. Further, each truck must be separately driven to a worksite, which may require additional features or paperwork for legal compliance with traffic laws, vehicle registration laws, etc. Such compliance may be complicated, time-consuming, and/or costly.

SUMMARY

According to an aspect of the disclosure, a base vehicle includes a base vehicle chassis comprising a front axle, a rear axle, and at least one frame rail. The base vehicle further includes an upper mount assembly including at least one mounting rail attached to a top of the at least one frame rail of the base vehicle chassis. The base vehicle further includes a lower mount assembly, including at least one mounting bracket attached to a bottom of the base vehicle chassis. The at least one mounting bracket is moveable between a retracted position proximate to the at least one frame rail and an extended position distal from the at least one frame rail. The at least one mounting rail is configured to receive at least one mounting bracket of an upper vehicle to mount the upper vehicle on top of the base vehicle. The at least one mounting bracket is configured to attach to at least one mounting rail of a lower vehicle to mount the base vehicle on top of the lower vehicle.

In certain embodiments, the at least one mounting rail is configured to receive a vocational module for mounting on top of the base vehicle. The vocational module includes at least one of a concrete mixer, concrete pumper, dump body, refuse body, roll-off body, or van body.

In certain embodiments, the at least one mounting rail includes a Z-rail having an upper portion, a lower portion, and an intermediate portion extending vertically between the upper portion and the lower portion. The at least one mounting rail further includes at least one plate attached to the intermediate portion and an outer surface of the at least one frame rail.

In certain embodiments, the at least one mounting bracket includes an L-bracket having a horizontal portion and a vertical portion.

In certain embodiments, the lower mount assembly includes at least one arm subassembly, including the at least one mounting bracket and at least one telescoping arm. The at least one mounting bracket is attached to the bottom of the at least one telescoping arm. The at least one telescoping arm is configured to move between the retracted position and the extended position.

In certain embodiments, the at least one mounting bracket is pivotably mounted to the at least one telescoping arm.

In certain embodiments, the lower mount assembly includes at least one body subassembly, including a left-arm subassembly, a right-arm subassembly, and a horizontal tube. The left-arm subassembly includes a left mounting bracket of at least one mounting bracket. The left mounting bracket includes a left L-bracket having a left horizontal portion and a left vertical portion. The left vertical portion includes a left pinhole. The left-arm subassembly further includes a left telescoping arm. The left mounting bracket is attached to a bottom of the left telescoping arm. The left telescoping arm is configured to move between the retracted position and the extended position. The right-arm subassembly includes a right mounting bracket of the at least one mounting bracket. The right mounting bracket includes a right L-bracket having a right horizontal portion and a right vertical portion. The right vertical portion includes a right pinhole. The right-arm subassembly further includes a right telescoping arm. The right mounting bracket is attached to a bottom of the right telescoping arm. The right telescoping arm is configured to between the retracted position and the extended position. The horizontal tube is attached to and extending between the left mounting bracket and the right mounting bracket. The horizontal tube includes a left retractable pin extending through the left pinhole of the left mounting bracket and a right retractable pin extending through the right pinhole of the right mounting bracket.

In certain embodiments, the at least one body subassembly includes a front-body subassembly positioned rearward of the front axle and a rear-body subassembly positioned rearward of the rear axle.

In certain embodiments, the at least one mounting rail includes a Z-rail having an upper portion, a lower portion, and an intermediate portion extending vertically between the upper portion and the lower portion. The at least one mounting rail further includes at least one plate attached to the intermediate portion and an outer surface of the at least one frame rail. The at least one mounting rail further includes a first plastic pad attached to an upper surface of the upper portion of the Z-rail. The at least one mounting bracket includes an L-bracket having a horizontal portion and a vertical portion, and a second plastic pad attached to a lower surface of the horizontal portion of the L-bracket.

In certain embodiments, the at least one mounting rail includes a Z-rail and at least one plate. The Z-rail has an upper portion, a lower portion, and an intermediate portion extending vertically between the upper portion and the lower portion. The intermediate portion includes at least one pinhole. The at least one plate is attached to the intermediate portion and an outer surface of the at least one frame rail. The at least one mounting bracket includes an L-bracket having a horizontal portion and a vertical portion. The vertical portion includes at least one pinhole.

In certain embodiments, the base vehicle further includes a plurality of leg assemblies comprising a front set of two leg assemblies and a rear set of two leg assemblies. Each leg assembly includes a telescoping leg attached to the base vehicle chassis, a leg actuator attached to a top of the telescoping leg, and a wheel attached to a bottom of the telescoping leg. The leg actuator moves the telescoping leg between a retracted position, where wheels of the base vehicle contact a ground, and an extended position, where wheels of the base vehicle are lifted off the ground.

In certain embodiments, the front set of two leg assemblies are positioned rearward of the front axle of the base vehicle chassis, and the rear body set of two leg assemblies are positioned rearward of the rear axle of the base vehicle chassis.

In certain embodiments, the base vehicle further includes at least one winch attached at a rear of the base vehicle chassis. The at least one winch includes a drum and a winch cable wrapped around the drum.

In certain embodiments, the base vehicle further includes at least one pulley configured to receive the winch cable.

In certain embodiments, the base vehicle further includes a left winch attached at a rear of the base vehicle chassis. The left winch comprising a left drum and a left winch cable wrapped around the left drum. The base vehicle further includes a right winch attached at a rear of the base vehicle chassis. The right winch comprising a right drum and a right winch cable wrapped around the right drum. The base vehicle further includes a left pulley set comprising a left upper pulley wheel and a left lower pulley wheel. The base vehicle further includes a right pulley set comprising a right upper pulley wheel and a right lower pulley wheel.

According to another aspect of the disclosure, a base vehicle system includes a plurality of base vehicles. Each base vehicle includes a base vehicle chassis, including a front axle, a rear axle, and at least one frame rail. Each base vehicle further includes an upper mount assembly, including at least one mounting rail attached to a top of the at least one frame rail of the base vehicle chassis. Each base vehicle further includes a lower mount assembly, including at least one mounting bracket attached to a bottom of the base vehicle chassis. The at least one mounting bracket is moveable between a retracted position proximate to the at least one frame rail and an extended position distal from the at least one frame rail. The at least one mounting rail is configured to receive at least one mounting bracket of an upper vehicle to mount the upper vehicle on top of the base vehicle. The at least one mounting bracket is configured to attach to at least one mounting rail of a lower vehicle to mount the base vehicle on top of the lower vehicle. The plurality of base vehicles includes a lower base vehicle and a stacked base vehicle. The upper mount assembly of the lower base vehicle is removably attached to the lower mount assembly of the stacked base vehicle.

In certain embodiments, the plurality of base vehicles includes an upper base vehicle. The upper mount assembly of the stacked base vehicle is removably attached to the lower mount assembly of the upper base vehicle.

According to another aspect of the disclosure, a towing system including a towing vehicle and at least one base vehicle. The towing vehicle includes a towing vehicle chassis including at least one frame rail and an upper mount assembly including at least one mounting rail attached to a top of the at least one frame rail of the towing vehicle chassis. Each base vehicle includes a base vehicle chassis, including a front axle, a rear axle, and at least one frame rail. Each base vehicle further includes an upper mount assembly, including at least one mounting rail attached to a top of the at least one frame rail of the base vehicle chassis. Each base vehicle further includes a lower mount assembly, including at least one mounting bracket attached to a bottom of the base vehicle chassis. The at least one mounting bracket is moveable between a retracted position proximate to the at least one frame rail and an extended position distal from the at least one frame rail. The at least one mounting rail is configured to receive at least one mounting bracket of an upper vehicle to mount the upper vehicle on top of the base vehicle. The at least one mounting bracket is configured to attach to at least one mounting rail of a lower vehicle to mount the base vehicle on top of the lower vehicle. The at least one base vehicle includes a lower base vehicle. The upper mount assembly of the towing vehicle is removably attached to the lower mount assembly of the lower base vehicle.

In certain embodiments, the plurality of base vehicles includes a stacked base vehicle. The upper mount assembly of the lower base vehicle is removably attached to the lower mount assembly of the stacked base vehicle.

In certain embodiments, the at least one base vehicle further includes a stack of base vehicles. At least one of the base vehicles in the stack of base vehicles is attached to a tow bar attached to a rear of the towing vehicle.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding and are incorporated in and constitute a part of this specification. The drawings illustrate one or more embodiment(s), and together with the description, serve to explain the principles and operation of the various embodiments.

BRIEF DESCRIPTION OF THE DRAWINGS

The accompanying drawing figures incorporated in and forming a part of this specification illustrate several aspects of the disclosure, and together with the description, serve to explain the principles of the disclosure.

FIG. 7A is a side view of the towing system of FIG. 2 with the base vehicle disengaged from the towing vehicle to load the base vehicle onto the towing vehicle;

FIG. 7B is a side view of the towing system of FIG. 7A with front and rear leg assemblies in an extended position and a winch cable attached to a front of a load portion of the towing vehicle;

FIG. 7C is a side view of the towing system of FIG. 7A with a front lower mount assembly engaged with a frame rail of the towing vehicle and the front and rear leg assemblies in the extended position;

FIG. 7D is a side view of the towing system of FIG. 7A with the front lower mount assembly engaged with the frame rail of the towing vehicle and the front leg assembly in a retracted position;

FIG. 8A is a side view of a base vehicle system with two base vehicles of FIGS. 1A-1D, including one base vehicle, disengaged from another base vehicle to load and stack the base vehicle onto another base vehicle;

FIG. 8B is a side view of the base vehicle system of FIG. 8A with the one base vehicle engaged with and stacked onto the other base vehicle;

FIG. 9A is a side view of the towing system of FIG. 2, including a stack of two base vehicles disengaged from the towing vehicle to load the stack of base vehicles onto the towing vehicle;

FIG. 9B is a side view of the towing system of FIG. 9A, including the stack of base vehicles engaged with and loaded onto the towing vehicle;

DETAILED DESCRIPTION

Figure 1A:
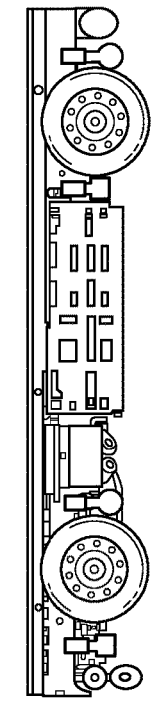
FIG. 1A is a side view of a base vehicle according to the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 1B:
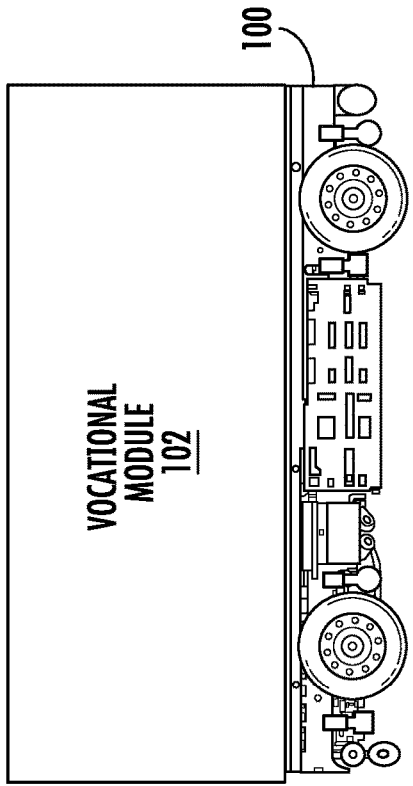
FIG. 1B is a side view of the base vehicle of FIG. 1 with a vocational module mounted to a top of the base vehicle.
Figure 1C:
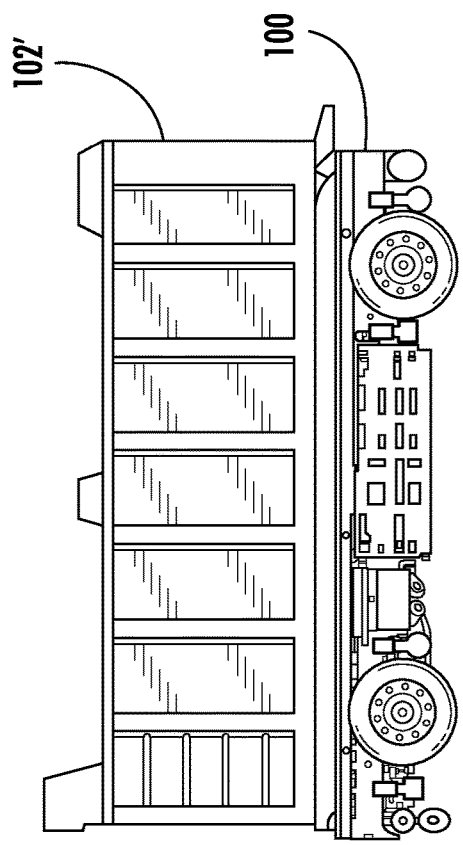
FIG. 1C is a side view of the base vehicle and vocational module of FIG. 1B with the vocational module embodied as a dump body.
Figure 1D:
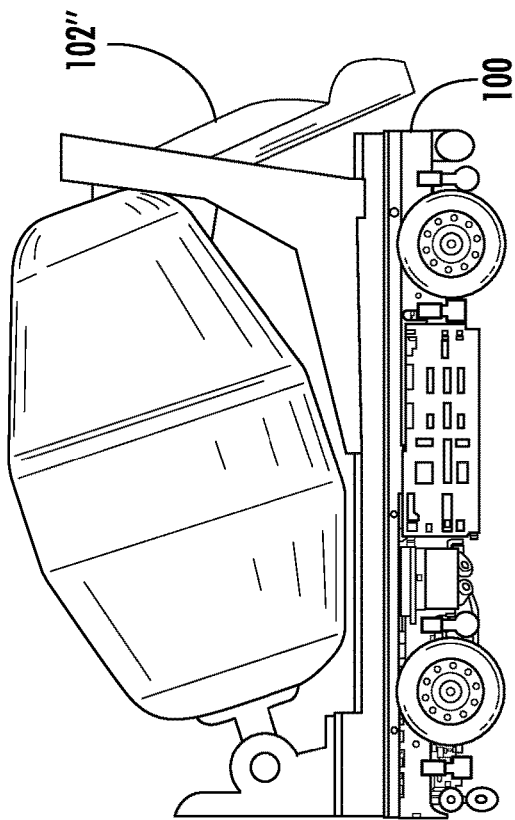
FIG. 1D is a side view of the base vehicle and vocational module of FIG. 1B with the vocational module embodied as a concrete mixer.

FIGS. 1A-1D are views of a base vehicle 100 according to the present disclosure. Referring to FIG. 1A, the base vehicle 100 is self-propelled and configured to be remotely operated to move the base vehicle around a worksite. Referring to FIG. 1B, the base vehicle 100 is configured to carry and transport one or more vocational modules 102 around the worksite. The vocational modules 102 are interchangeable with the base vehicle 100. In certain embodiments, the vocational module 102 includes at least one of a concrete mixer, concrete pumper, dump body, refuse body, roll-off body, or van body. For example, referring to FIG. 1C, in certain embodiments, the vocational module 102 includes a dump body 102' and referring to FIG. 1D, in certain embodiments, the vocational module 102 includes a concrete mixer 102". Accordingly, as an example, the base vehicle 100 may be used to transport and set a concrete mixer 102" at one location (e.g., of a worksite). While the concrete mixer 102" is being used, the base vehicle 100 may be used to transport the dump body 102' to another part of the worksite. In this way, the base vehicle 100 provides more flexibility and is independent of operation of the vocational module 102. Further, multiple base vehicles 100 may be used interchangeably to transport vocational modules 102.

Figure 2:
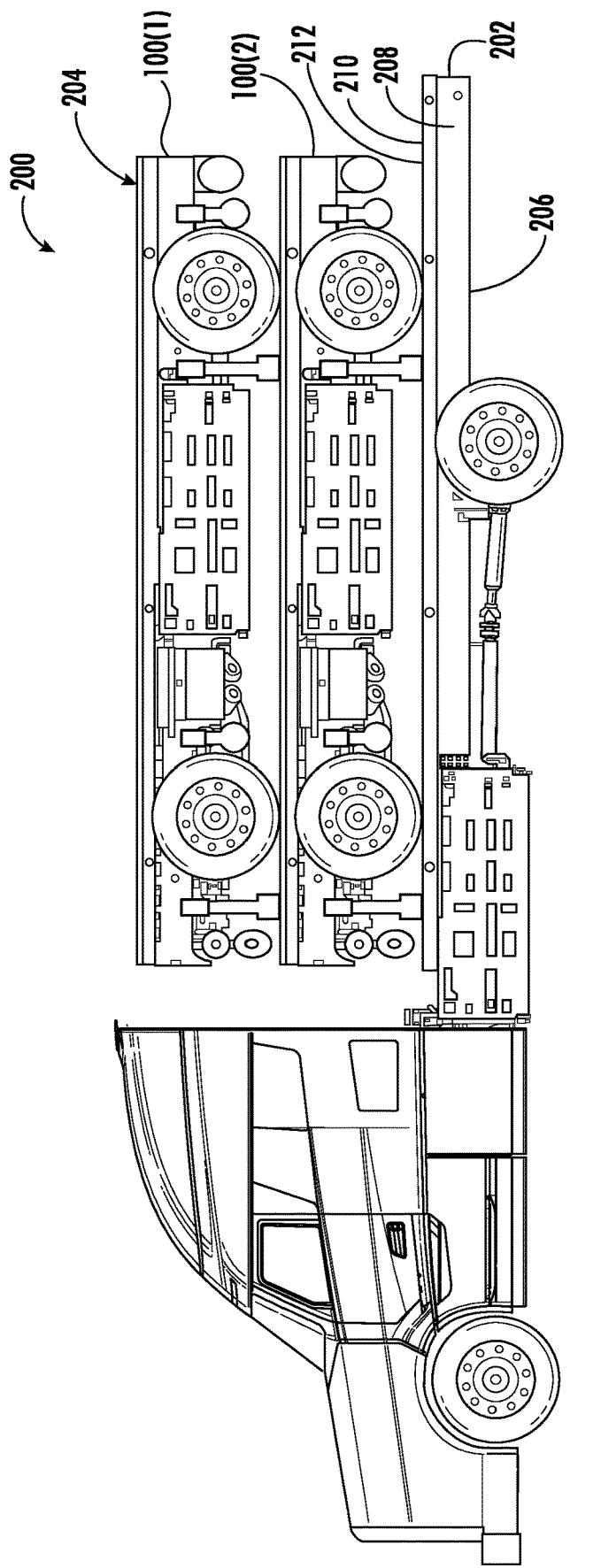
FIG. 2 is a side view of a towing system including a towing vehicle and base vehicle system including a plurality of base vehicles of FIGS. 1A-1D stacked on top of one another.
Figure 3A:
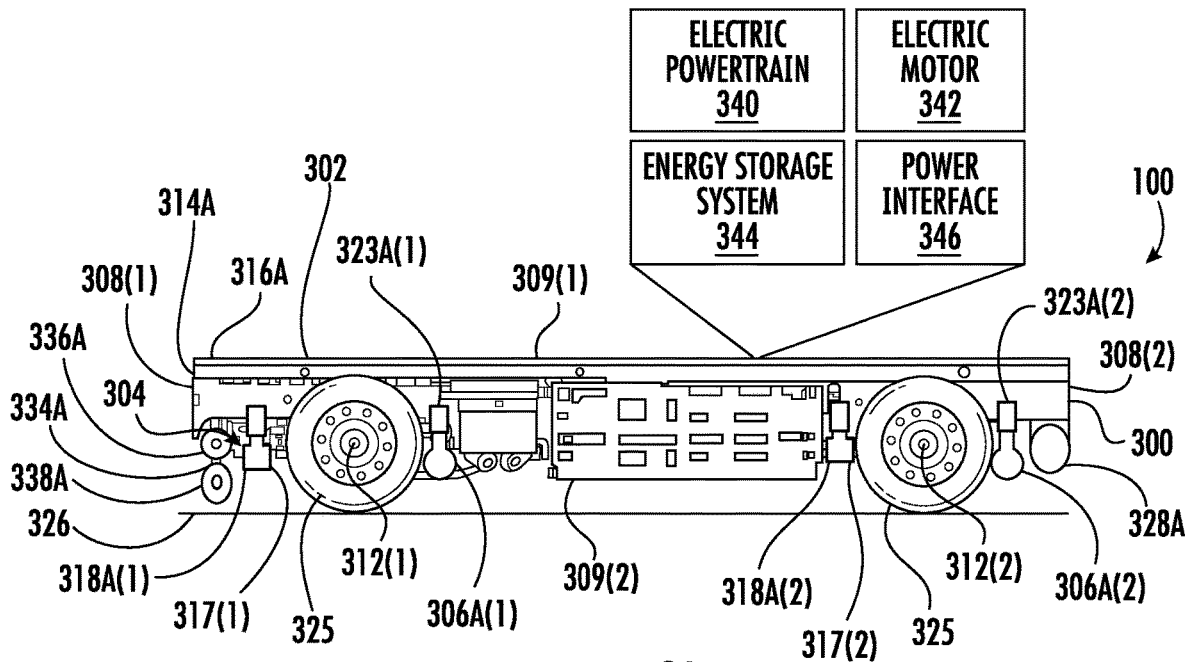
FIG. 3A is a side view of the base vehicle of FIGS. 1A-1E with lower mount assemblies and leg assemblies in a retracted position.
Figure 3B:
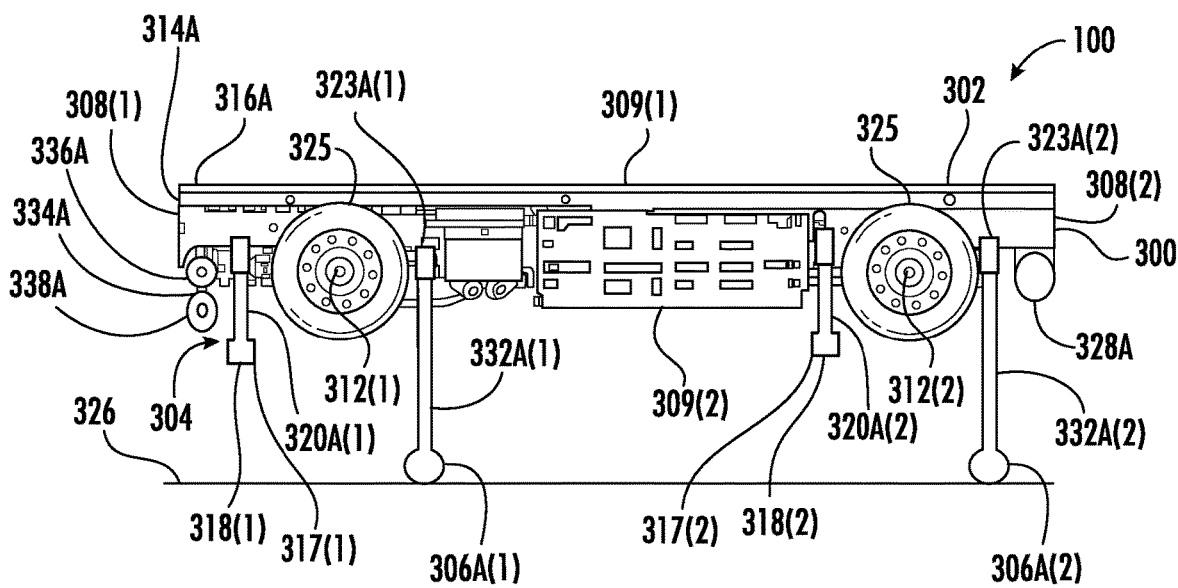
FIG. 3B is a side view of the base vehicle of FIG. 3A with lower mount assemblies and leg assemblies in an extended position.
Figure 3D:
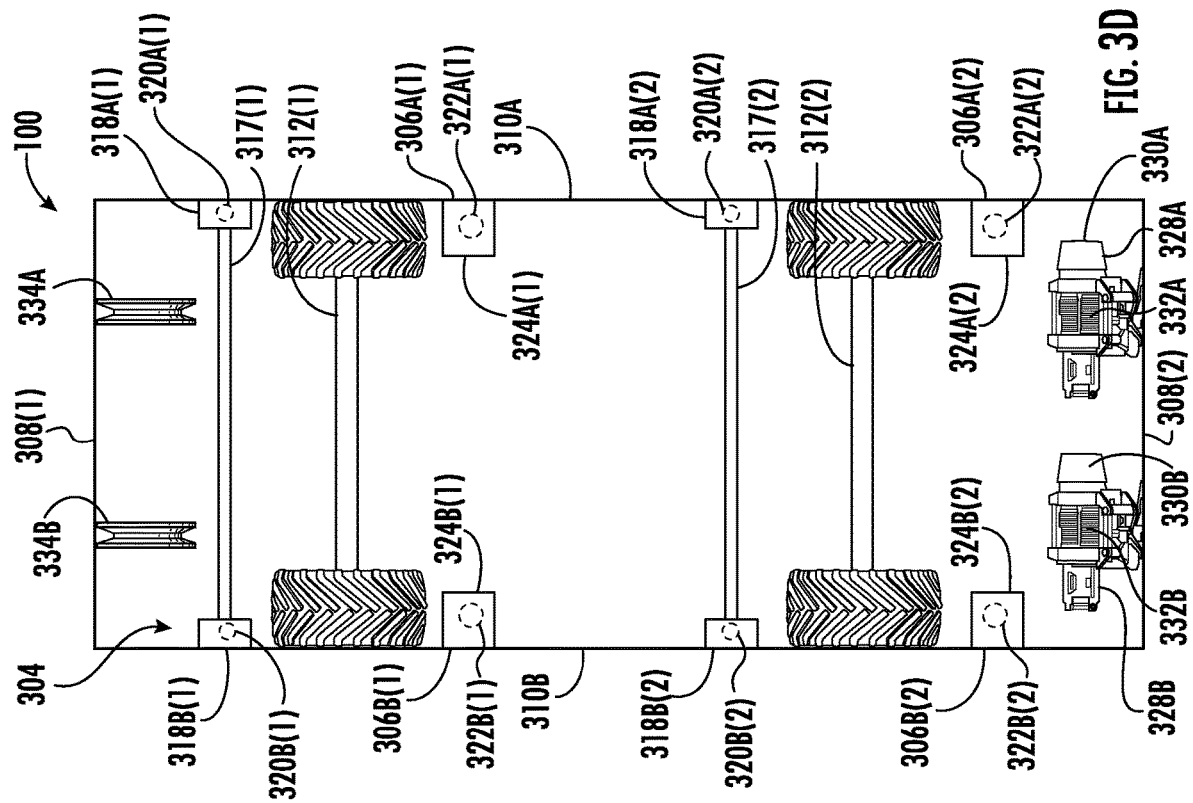
FIG. 3D is a bottom view of the base vehicle of FIG. 3A.
Figure 3C:
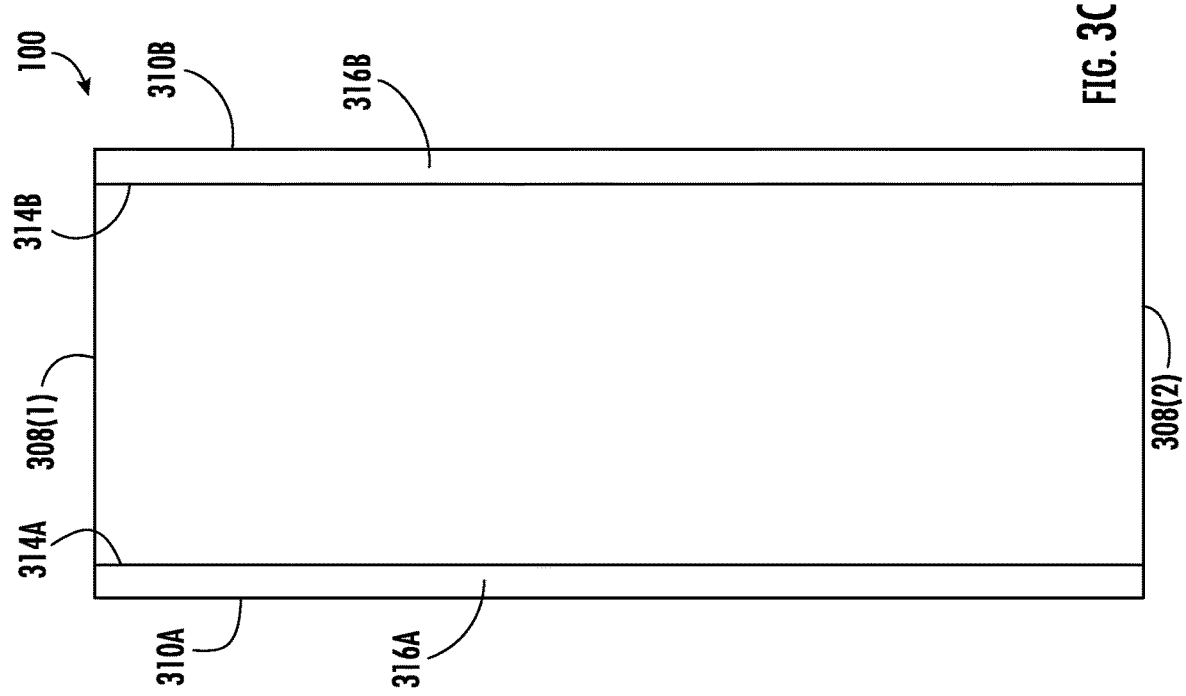
FIG. 3C is a top view of the base vehicle of FIG. 3A.

FIG. 2 is a side view of a towing system 200 including a towing vehicle 202 and base vehicle system 204 including a plurality of base vehicles 100 of FIGS. 1A-1D stacked on top of one another. The base vehicles 100(1), 100(2) (referred to generally as base vehicles 100) may be stacked with one another for storage and/or transportation. In particular, a towing vehicle 202 may be used to transport one or more base vehicles 100 to or from a worksite. In this way, only the towing vehicle 202 needs to be road compliant (e.g., vehicle features, traffic laws, vehicle registration laws, etc.). For example, only the towing vehicle 202 even needs a cab for a driver.

The towing vehicle 202 includes a towing vehicle chassis 206 including at least one frame rail 208, an upper mount assembly 210 including at least one mounting rail 212 (e.g., Z-rail) attached to a top of the at least one frame rail 208 of the towing vehicle chassis 206.

FIGS. 3A-3D are views of the base vehicle 100 of FIGS. 1A-1E. The base vehicle includes a base vehicle chassis 300, upper mount assembly 302, lower mount assembly 304, and leg assemblies 306A(1)-306B(2) (may be referred to generally as leg assemblies 306). The base vehicle 100 has a front end 308(1), a rear-end 308(2), a top side 309(1), a bottom side 309(2), a left side 310A, and a right side 310B. The base vehicle chassis 300 includes a front axle 312(1) (e.g., steer axle), a rear axle 312(2) (e.g., drive axle), and frame rails 314A, 314B.

The upper mount assembly 302 is configured to receive a vocational module 102 and/or to receive another base vehicle 100 to stack the base vehicles 100. In certain embodiments, the upper mount assembly 302 includes mounting rails 316A, 316B (may be referred to generally as mounting rails 316) attached to a top of the frame rail 314A, 314B (may be referred to generally as frame rails 314) of the base vehicle chassis 300.

The lower mount assembly 304 is configured to mount the base vehicle 100 to the towing vehicle 202 and/or to the upper mount assembly 302 of another base vehicle 100 to stack the base vehicles 100. In certain embodiments, the lower mount assembly 304 includes a front-body subassembly 317(1) (may also be referred to as a front mount, front lower mount assembly, front mount assembly) positioned frontward of the front axle 312(1) and a rear body subassembly 317(2) (may also be referred to as a rear mount, rear lower mount assembly, rear mount assembly) positioned frontward of the rear axle 312(2).

The front-body subassembly 317(1) includes a front set of mounting brackets 318A(1), 318B(1) (may be referred to generally as front set of mounting brackets 318(1)) attached to a bottom of the base vehicle chassis 300, and the rear-body subassembly 317(2) includes rear set of mounting brackets 318A(2), 318B(2) (may be referred to generally as rear set of mounting brackets 318(2)) attached to the bottom of the base vehicle chassis 300. The front and rear mounting brackets 318(1), 318(2) (may be referred to generally as mounting brackets 318) are moveable between a retracted position proximate to the frame rails 316 and an extended position distal from the frame rails 316. For example, in certain embodiments, the mounting brackets 318 are mounted to telescoping arms 320A(1)-320B(2). In particular, referring to FIG. 3A, the mounting brackets 318 are in the retracted position, while in FIG. 3B, the mounting brackets 318 are in the extended position.

Accordingly, the mounting rails 316 are configured to receive the mounting bracket 318 of an upper vehicle (e.g., a base vehicle 100) to mount the upper vehicle on top of the base vehicle 100. Further, the mounting bracket 318 is configured to attach to at least one mounting rail 316 of a lower vehicle to mount the base vehicle 100 on top of the lower vehicle (e.g., a base vehicle 100, a towing vehicle 202, etc.).

The plurality of leg assemblies 306A(1)-306B(2) includes a front set of two leg assemblies 306A(1), 306B(1) (may be referred to as a front set of two leg assemblies 306(1)) and a rear set of two leg assemblies 306A(2), 306B(2) (may be referred to as a rear set of two leg assemblies 306(2)). The front set of two leg assemblies 306(1) are positioned rearward of the front axle 312(1) of the base vehicle chassis 300, and the rear body set of two leg assemblies 306(2) are positioned rearward of the rear axle 312(2) of the base vehicle chassis 300. Each leg assembly 306A(1)-306B(2) includes a telescoping leg 322A(1)-322B(2) attached to the base vehicle chassis 300, a leg actuator 323A(1)-323A(2) (actuators are similarly provided for telescoping legs 322B(1), 322B(2)) attached to a top of the telescoping leg 322A(1)-322B(2), and a wheel 324A(1)-324B(1) attached to a bottom of the telescoping leg 322A(1)-322B(2). In certain embodiments, the leg actuators 323A(1)-323B(2) are hydraulic actuators (e.g., hydraulic cylinders). The leg actuator 323A(1)-323A(2) moves the telescoping leg 322A(1)-322B(2) and the wheel 324A(1)-324B(1) between a retracted position, where wheels 325 of the base vehicle 100 contact a ground 326, and an extended position, where the wheels 325 of the base vehicle 100 are lifted off the ground 326. In this way, the leg assemblies 306A(1)-306B(2) are used to raise the base vehicle 100 for loading the base vehicle 100 onto and off of another base vehicle 100 and/or a towing vehicle 202.

The base vehicle 100 further includes winches 328A, 328B attached at a rear 308(2) of the base vehicle chassis 300. In particular, a left winch 328A and a right winch 328B attached at a rear 308(2) of the base vehicle chassis 300. Each winch 328A, 328B includes a drum 330A, 330B and a winch cable 332A, 332B wrapped around the drum 330A, 330B. In particular, the left winch 328A includes a left drum 330A and a left winch cable 332A wrapped around the left drum 330A. The right winch 328B includes a right drum 330B and a right winch cable 332B wrapped around the right drum 330B. The base vehicle 100 further includes a pulley set 334A, 334B configured to receive the winch cable 332A, 332B. The left pulley set 334A includes a left upper pulley wheel 336A and a left lower pulley wheel 338A, and the right pulley set 334B includes a right upper pulley wheel 336B and a right lower pulley wheel 338B. The winches 328A, 328B and pulley sets 334A, 334B are used to load the base vehicle 100 onto and off of another base vehicle 100 and/or a towing vehicle 202.

In certain embodiments, the base vehicle 100 is operated remotely and/or operated autonomously. In certain embodiments, the base vehicle 100 includes an electric powertrain, electric motor, an energy storage system (e.g., DC energy storage), and/or a power interface (e.g., to connect to a power system for power). In this way, the base vehicle 100 is capable of supplying a limited amount of power to itself and/or a vocational module 102. The base vehicle 100 may also be directly plugged into another source to supply power to a vocational module 102. In certain embodiments, the base vehicle 100 can be operating under a grid power supplied at a worksite so that the base vehicle 100 is ready for a towing vehicle 202 to pick up the base vehicle 100 and then transport and deploy that base vehicle 100 at another work site. For remote situations, mobile charging bases may be deployed, or temporary connections to grid power may be used.

Electrically powering vocational modules 102 instead of using fossil fuels is expected to significantly reduce operating costs. Further, reducing the number of truck drivers required at a worksite will also reduce operating costs and provide more flexibility in employee utilization.

Figure 4A:
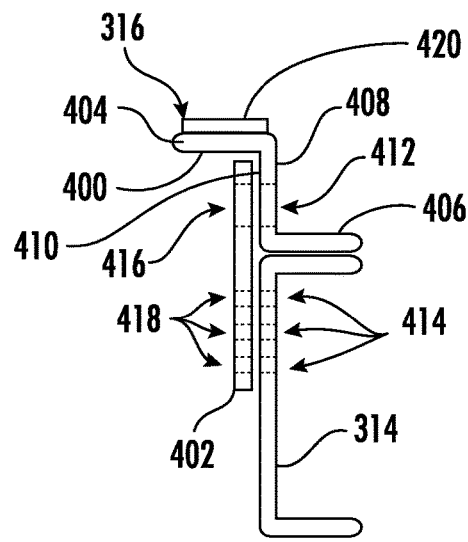
FIG. 4A is a cross-sectional view of a mounting rail attached to a frame rail.
Figure 4B:
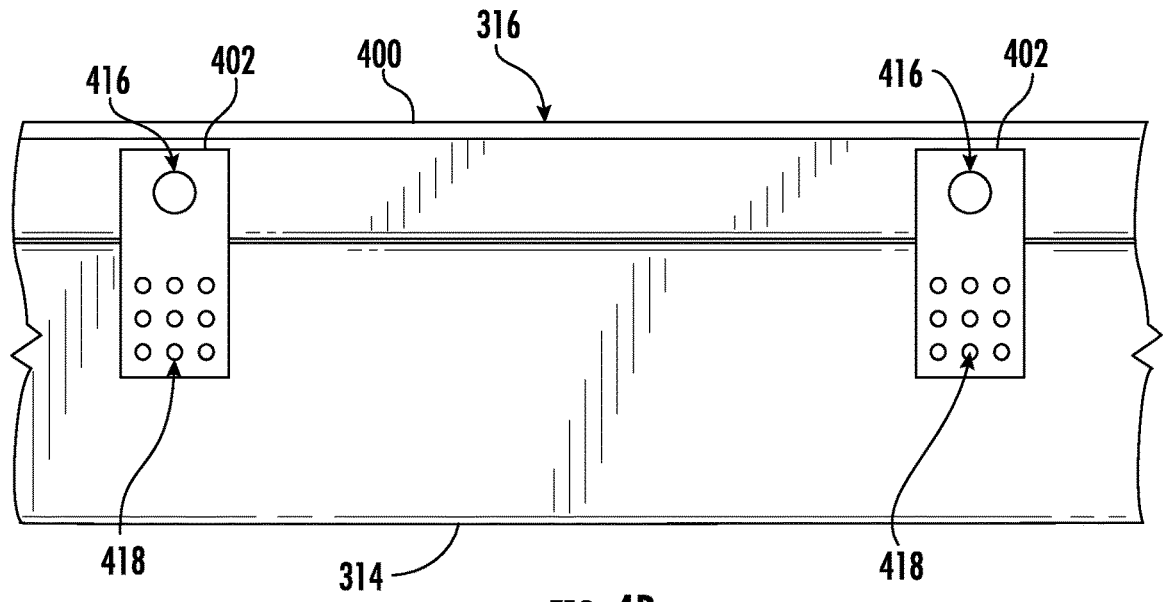
FIG. 4B is one embodiment of the mounting rail of FIG. 4A attached to the frame rail.

FIGS. 4A-4B are views of a mounting rail 316 attached to a frame rail 314. Referring to FIG. 4A, the mounting rail 316 includes a Z-rail 400 and at least one plate 402. The Z-rail 400 has an upper portion 404, a lower portion 406, and an intermediate portion 408 extending vertically between the upper portion 404 and the lower portion 406. The lower portion 406 of the Z-rail 400 contacts an upper surface of the frame rail 314. The plate 402 is attached to the intermediate portion 408 and an outer surface 410 of the frame rail 314. As a result, the load of the Z-rail 400 is vertical, but the Z-rail 400 is held in place by the plate 402. In particular, the intermediate portion 408 of the Z-rail 400 includes a pinhole 412, and the frame rail 314 includes at least one hole 414. Further, the plate 402 includes at least one pinhole 416 aligned with the pinhole 412 of the Z-rail 400 to receive a fastener therethrough. The plate 402 also includes at least one mounting hole 418 aligned with the at least one hole 414 of the frame rail 314 to receive a fastener therethrough.

In certain embodiments, the Z-rail 400 further includes a plastic pad 420 attached to an upper surface of the upper portion 404 to facilitate engagement with the lower mount assembly 304.

Figure 4C:
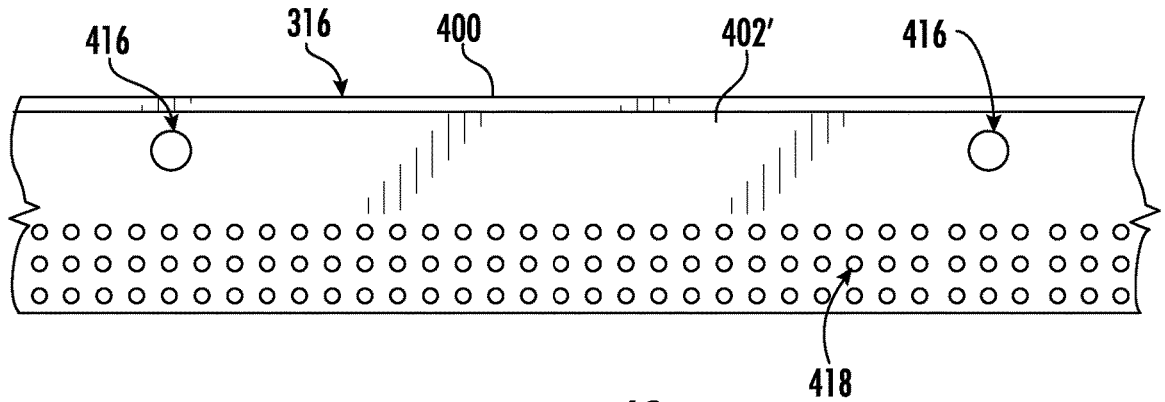
FIG. 4C is another embodiment of the mounting rail of FIG. 4A attached to the frame rail.

FIG. 4B illustrates one embodiment including a plurality of plates 402 that are positioned at select locations along a length of the Z-rail 400 and/or the frame rail 314. FIG. 4C illustrates an alternative embodiment utilizing one plate 402' that spans a length of the Z-rail 400 and/or the frame rail 314.

Figure 5A:
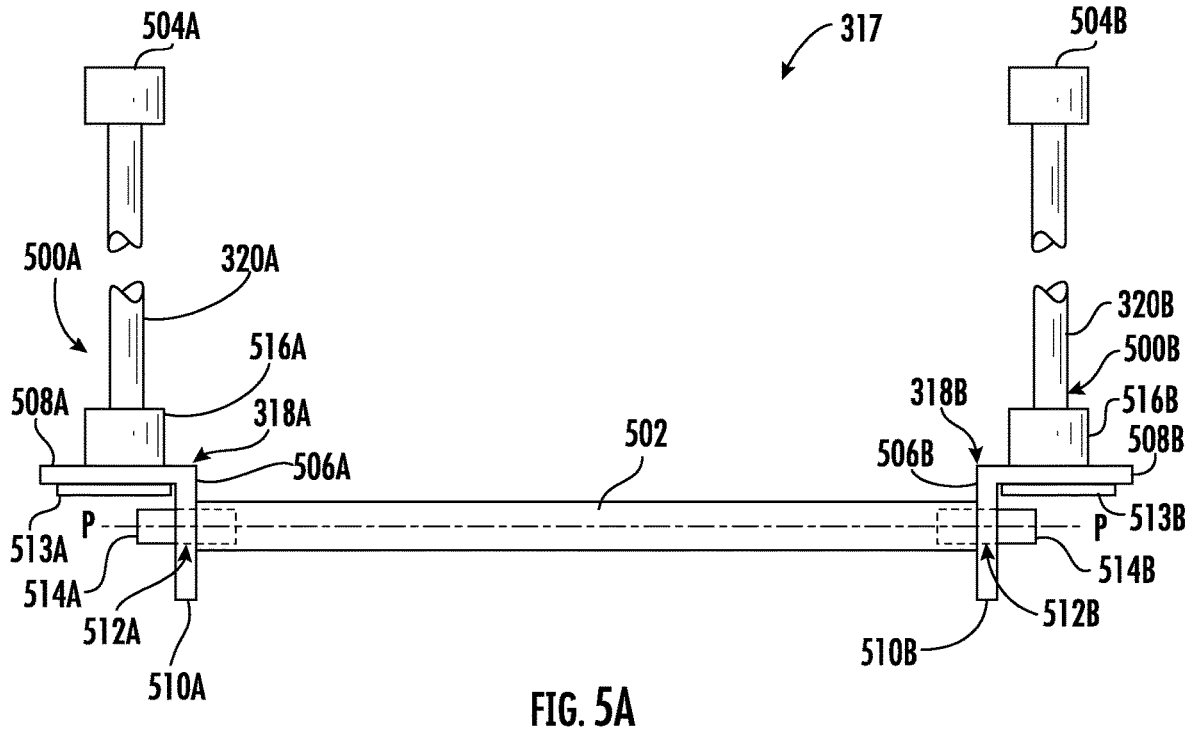
FIG. 5A is a front view of a body subassembly of a lower mount assembly of the base vehicle of FIGS. 1-1D.
Figure 5B:
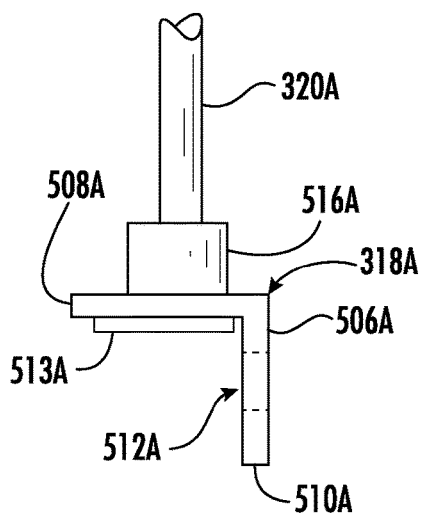
FIG. 5B is a front view of a portion of a left-arm of the lower mount assembly of FIG. 5A.
Figure 5C:
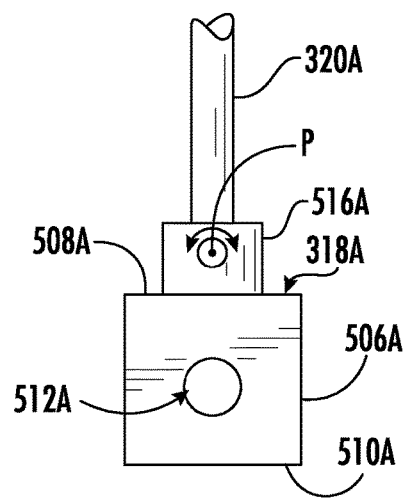
FIG. 5C is a side view of a portion of the left-arm of FIG. 5B.

FIGS. 5A-5C are views of a body subassembly 317 of the lower mount assembly 304. In particular, the body subassembly 317 includes a left-arm subassembly 500A, a right-arm subassembly 500B, and a horizontal tube 502 therebetween. The horizontal tube 502 provides rigidity and structural support. Each of the arm subassemblies 500A, 500B includes mounting brackets 318A, 318B attached to the bottom of telescoping arms 320A, 320B. Further, the body subassembly 317 includes arm actuators 504A, 504B attached to a top of the telescoping arms 320A, 320B. In certain embodiments, the arm actuators 504A, 504B are hydraulic actuators (e.g., hydraulic cylinders). In certain embodiments, a single-arm actuator 504A, 504B may be used. The arm actuator 504A, 504B moves the telescoping arms 320A, 320B and the mounting brackets 318A, 318B between a retracted position, where the mounting brackets 318A, 318B are disengaged (e.g., with mounting rails 316), and an extended position, where the mounting brackets 318A, 318B are engaged (e.g., with mounting rails 316).

Each of the mounting brackets 318A, 318B includes an L-bracket 506A, 506B having a horizontal portion 508A, 508B and a vertical portion 510A, 510B, where the vertical portion 510A, 510 includes a hole 512A, 512B. In certain embodiments, the mounting brackets 318A, 318B include a plastic pad 513A, 513B attached to a lower surface of the horizontal portion 508A, 508B of the L-bracket 506A, 506B.

The horizontal tube 502 is attached to and extending between the left mounting bracket 318A and the right mounting bracket 318B. The horizontal tube 502 includes a left retractable pin 514A extending through the left hole 512A of the left mounting bracket 318A and a right retractable pin 514B extending through the right hole 512B of the right mounting bracket 318B. In certain embodiments, the retractable pins 514A, 514B are spring-loaded to bias the retractable pins 514A, 514B to an extended position.

Mounting brackets 318A, 318B are pivotably mounted to telescoping arms 320A, 320B by pivotal attachment 516A, 516B. FIG. 5B is a front view of a portion of the left-arm 320A of the lower mount assembly 304. FIG. 5C is a side view of a portion of the left-arm 320A. As illustrated, left mounting bracket 318A is mounted to telescoping arm 320A by pivotal attachment 516A such that the mounting bracket 318A is able to pivot around axis P. In other words, the mounting brackets 318A, 318B and horizontal tube 502 may be pivoted around axis P. The pivoting facilitates engagement of the mounting brackets 318A, 318B with the mounting rails 316.

Figure 6A:
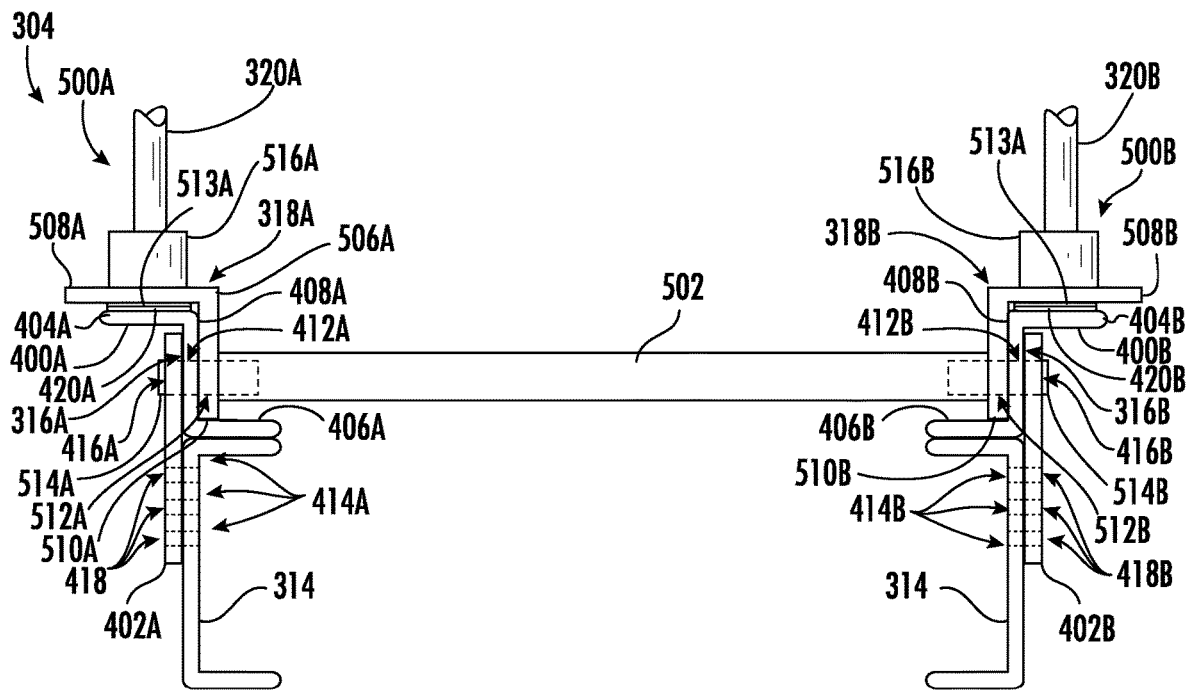
FIG. 6A is a front view of the lower mount assembly of FIG. 5A mounted to the mounting rail of FIGS. 4A-4B.
Figure 6B:
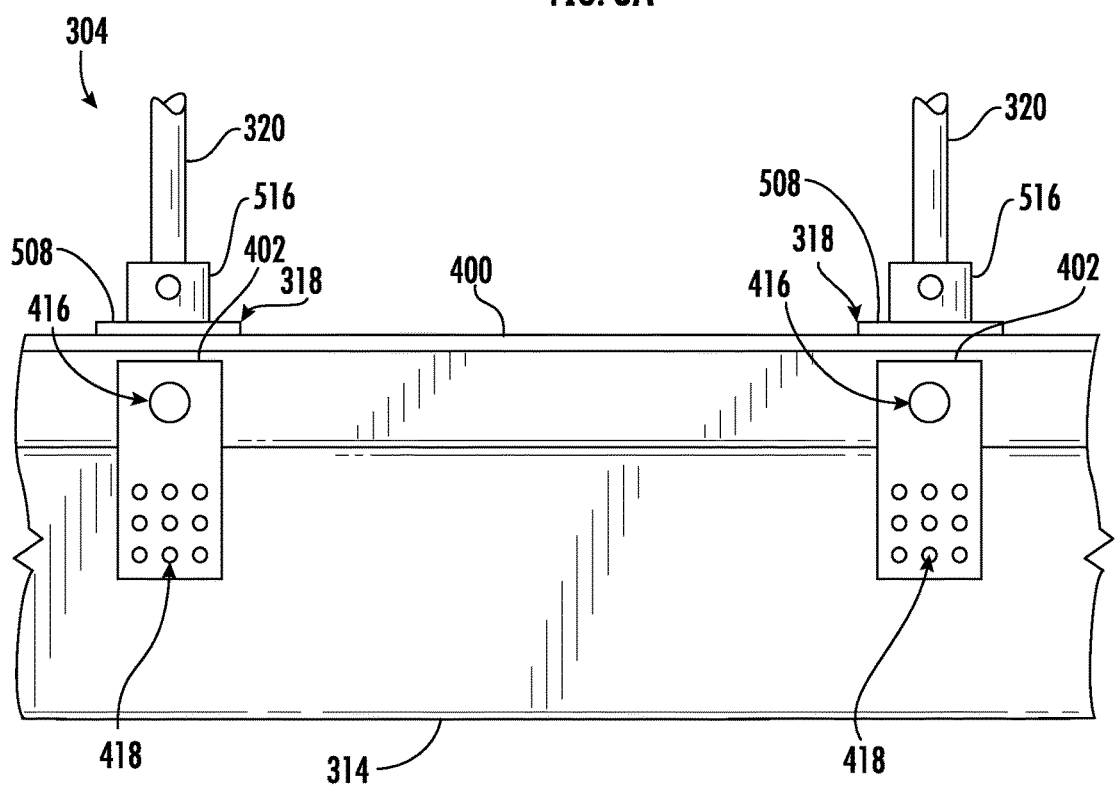
FIG. 6B is a side view of the lower mount assembly of FIG. 5A mounted to the mounting rail of FIGS. 4A-4B.

FIGS. 6A-6B are views of the lower mount assembly 304 mounted to mounting rails 316A, 316B. Referring to FIG. 6A, the horizontal portions 508A, 508B of the L-brackets 506A, 506B contact the upper portion 404A, 404B of Z-rails 400 (and particular the plastic pads 420A, 420B). Vertical portions 510A, 510B of the L-brackets 506A, 506B are proximate and interior to the intermediate portion 408A, 408B of the Z-rails 400A, 400B, such that the pinhole 412A, 412B of the Z-rails 400A, 400B, and the pinhole 416A, 416B of the plates 402A, 402B align with and receive the retractable pins 514A, 514B, thereby securing the lower mount assembly 304 to the mounting rails 316A, 316B. Referring to FIG. 6B, front-body subassembly 317(1), and rear body subassembly 317(2) may both be attached in this manner to the mounting rails 316A, 316B.

FIGS. 7A-7H are views of a towing system 200 illustrating loading and unloading a base vehicle 100 from a towing vehicle 102.

Referring to FIG. 7A, the base vehicle 100 is initially disengaged from the towing vehicle 202. Referring to FIG. 7B, the leg assemblies 306(1), 306(2) of the base vehicle 100 actuate to raise the base vehicle 100, positioning the wheels 325 of the base vehicle 100 above a load portion 700 of the towing vehicle 202. The winch cables 332A, 332B of the winches 328A, 328B are fed through the pulley sets 334A, 334B and attached at a front end 702 of the load portion 700 of the towing vehicle 202.

Referring to FIG. 7C, operation of the winches 328A, 328B draws the base vehicle 100 onto the load portion 700 of the towing vehicle 202 until the front lower mount assembly 317(1) (forward of the front axle 312(1)) engages the mounting rails 212 (similar or same as mounting rails 316) of the towing vehicle 202 and/or the wheels 325 of the base vehicle 100 contact the load portion 700 of the towing vehicle 202. Referring to FIG. 7D, the front leg assembly 306(1) is then retracted, and operation of the winches 328A, 328B further pulls the base vehicle 100 onto the load portion 700 of the towing vehicle 202.

Figure 7E:
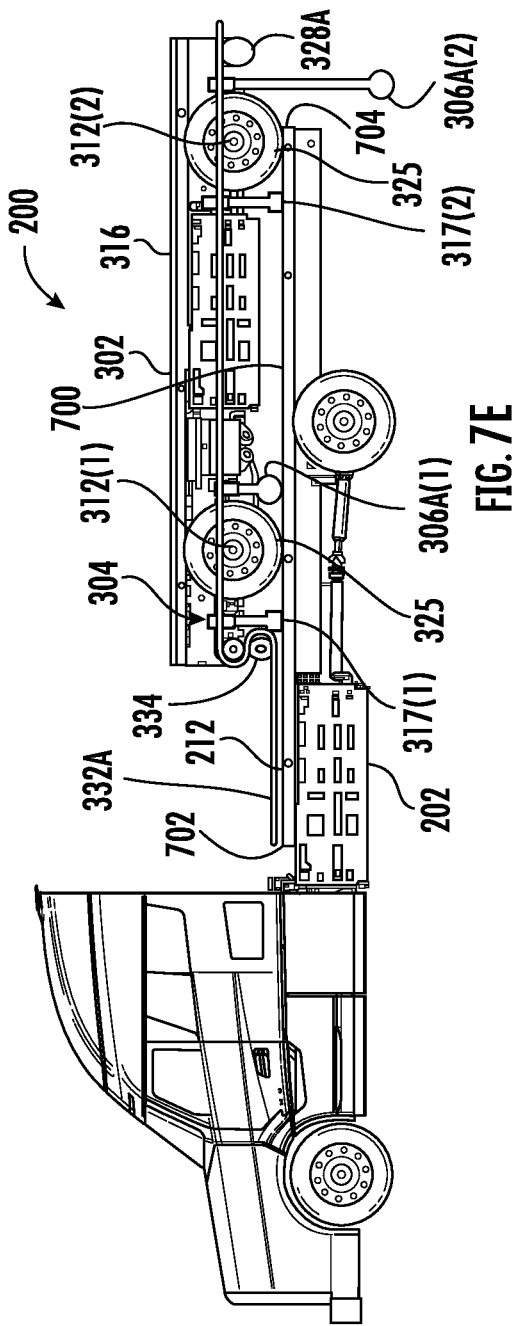
FIG. 7E is a side view of the towing system of FIG. 7A with the front and rear lower mount assemblies engaged with the frame rail of the towing vehicle and the front leg assembly in the retracted position.
Figure 7F:
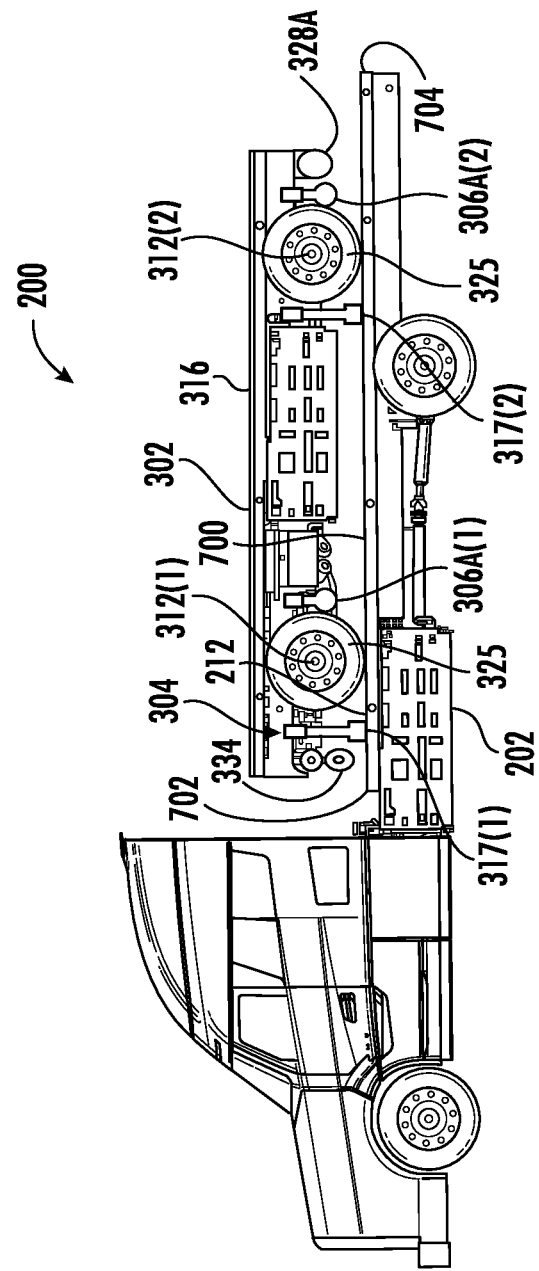
FIG. 7F is a side view of the towing system of FIG. 7A with the front and rear lower mount assemblies engaged with the frame rail of the towing vehicle and the front and rear leg assemblies in the retracted position.

Referring to FIG. 7E, further operation of the winches 328A, 328B draws the base vehicle 100 further onto the load portion 700 of the towing vehicle 202 until the rear lower mount assembly 317(2) (forward of the rear axle 312(2)) engages the mounting rails 212 of the towing vehicle 202 and/or the wheels 325 of the base vehicle 100 contacts the load portion 700 of the towing vehicle 202. Referring to FIG. 7F, the rear leg assembly 306(2) is then retracted, and operation of the winches 328A, 328B further pulls the base vehicle 100 onto the load portion 700 of the towing vehicle 202. Thereby, the base vehicle 100 is further loaded onto and secured to the towing vehicle 202.

Figure 7G:
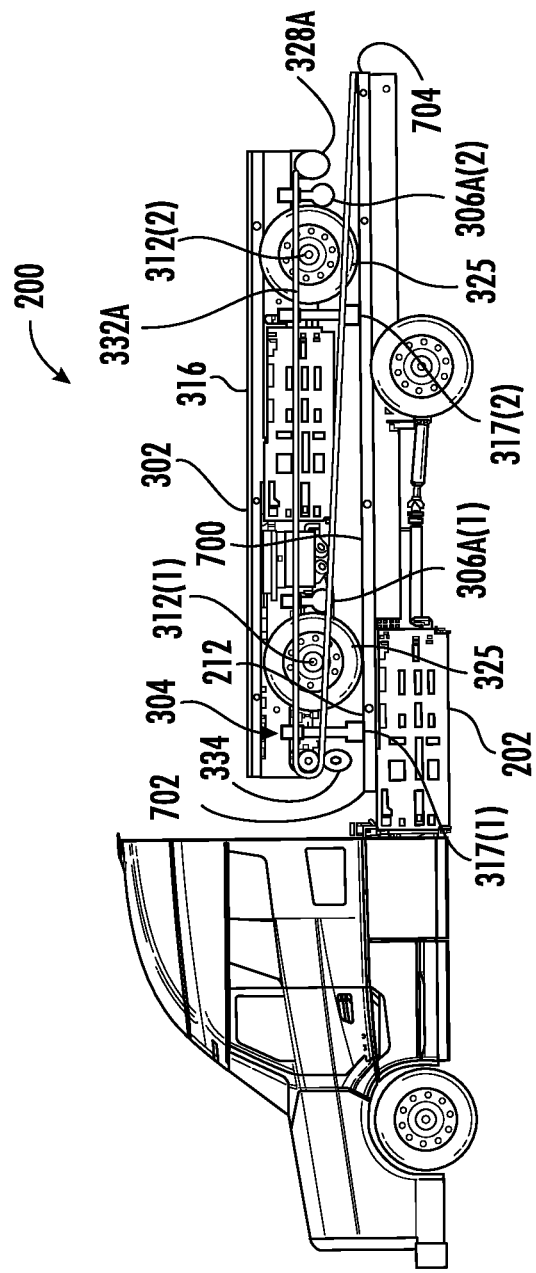
FIG. 7G is a side view of the towing system of FIG. 7A illustrating offloading the base vehicle from the towing vehicle by attaching the winch cable to a rear of the load portion of the towing vehicle.
Figure 7H:
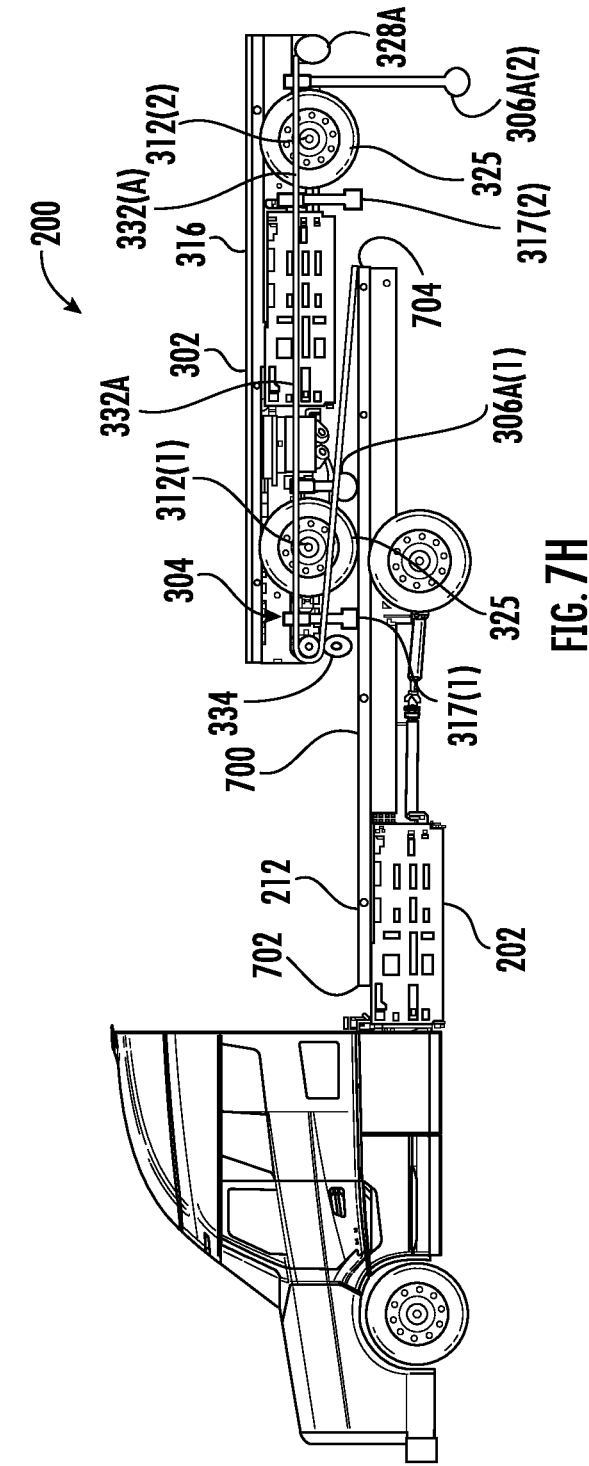
FIG. 7H is a side view of the towing system of FIG. 7A with the base vehicle partially offloaded from the towing vehicle.

Referring to FIG. 7G, to unload the base vehicle from the load portion of the towing vehicle, the winch cables 332A, 332B are fed through the pulley sets 334A, 334B to a rear end 704 of the load portion 700 of the towing vehicle 202. Referring to FIG. 7H, operation of the winches 328A, 328B draw the base vehicle 100 off of the load portion 700 of the towing vehicle 202. The process operates in reverse, as discussed above.

Figure 8C:
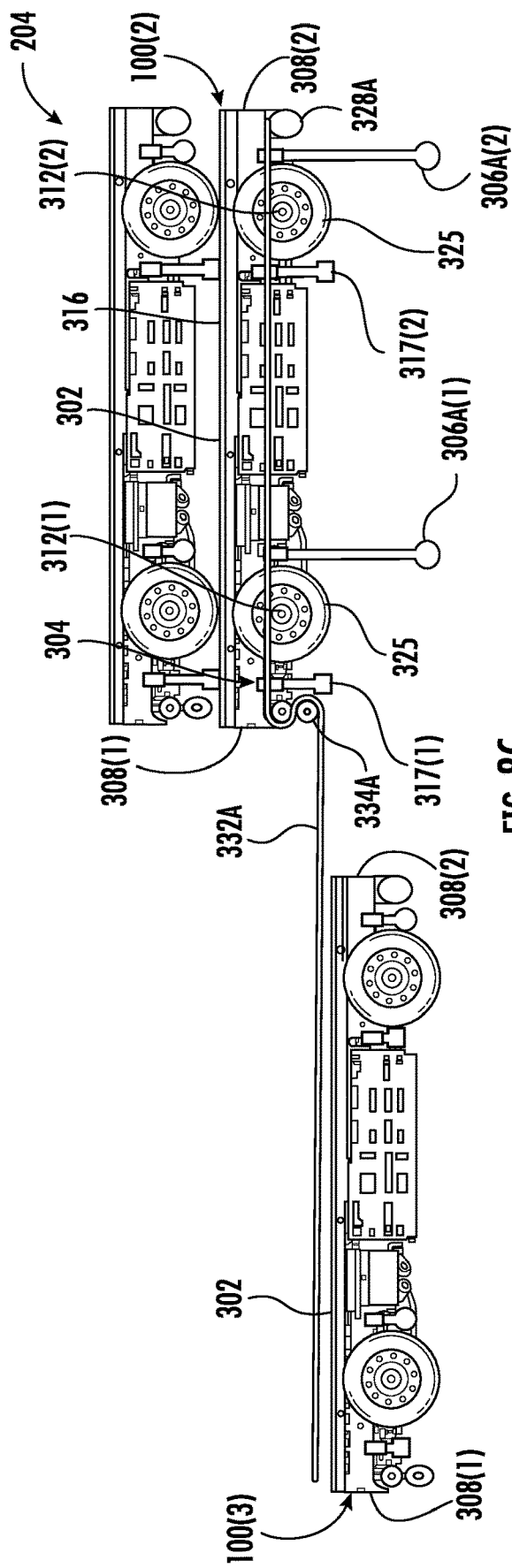
FIG. 8C is a side view of the base vehicle system of FIG. 8A, including a stack of two base vehicles disengaged from a third base vehicle to load the stack onto the third base vehicle.

FIGS. 8A-8D are views of a base vehicle system 204 with two base vehicles 100(1), 100(2), loading one base vehicle 100(1) onto another base vehicle 100(2). Referring to FIG. 8A, a first base vehicle 100(1) is disengaged from a second base vehicle 100(2), and (as similarly discussed above), the leg assemblies 306A(1), 306A(2) of the first base vehicle 100(1) are operated to raise the first base vehicle 100(1), and the winches cables 332A are fed through the pulley system 334A to a front 308(1) of the second base vehicle 100(2). Referring to FIG. 8B, operation of the winches 328A, 328B draws the first base vehicle 100(1) onto the second base vehicle 100(2) such that the lower mount assembly 304 (e.g., front and rear body subassemblies 317(1), 317(2)) of the first base vehicle 100(1) engages and is removably attached to the upper mount assembly 302 (e.g., mounting rails 316) of the second base vehicle 100(2). Accordingly, the first base vehicle 100(1) and the second base vehicle 100(2) form a stack 800.

Figure 8D:
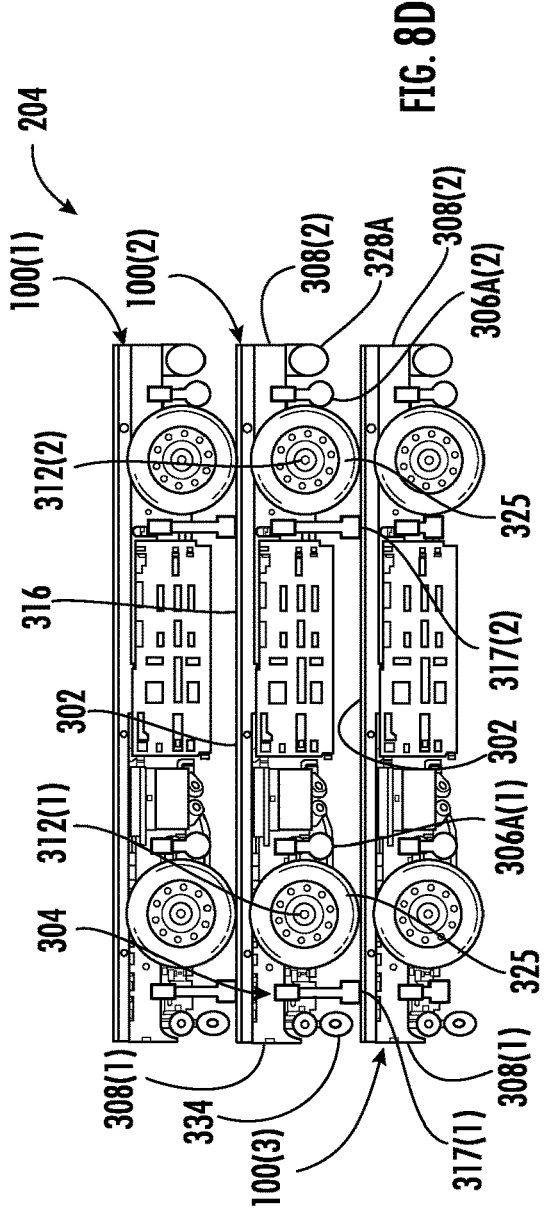
FIG. 8D is a side view of the base vehicle system of FIG. 8A including the stack of two base vehicles engaged with and stacked onto the third base vehicle.

Referring to FIG. 8C, to stack an additional third base vehicle 100(3), the leg assemblies of the second base vehicle 100(2) (e.g., the lowest base vehicle 100) are operated to raise the second base vehicle 100(2) (and accordingly the first base vehicle 100(1) stacked on top). The winch cables 332A, 332B of the second base vehicle 100(2) are then fed through the pulley system 334A, 334B to a front 308(1) of the third base vehicle 100(3). Referring to FIG. 8D, operation of the winches 328A, 328B draws the stack of base vehicles 100(1), 100(2) onto the third base vehicle 100(3) such that the lower mount assembly 304 (e.g., front and rear body subassemblies 317(1), 317(2)) of the second base vehicle 100(2) engages and is removably attached to the upper mount assembly 302 (e.g., mounting rails 316) of the third base vehicle 100(3).

In other words, the upper mount assembly 302 of the lower base vehicle 100(3) is removably attached to the lower mount assembly 304 of the stacked base vehicle 100(2). Further, the upper mount assembly 302 of the stacked base vehicle 100(2) is removably attached to the lower mount assembly 304 of the upper base vehicle 100(1).

It is noted that additional base vehicles 100 may be stacked according to this process. It is further noted that unstacking of the base vehicles 100 would follow a similar process as that described above with respect to FIGS. 7G-7H.

FIGS. 9A-9B illustrate loading a stack of two base vehicles 100(1), 100(2) onto a towing vehicle 202. As similarly described above, the lowest base vehicle 100(2), raises and then engages the towing vehicle 202.

Figure 10:
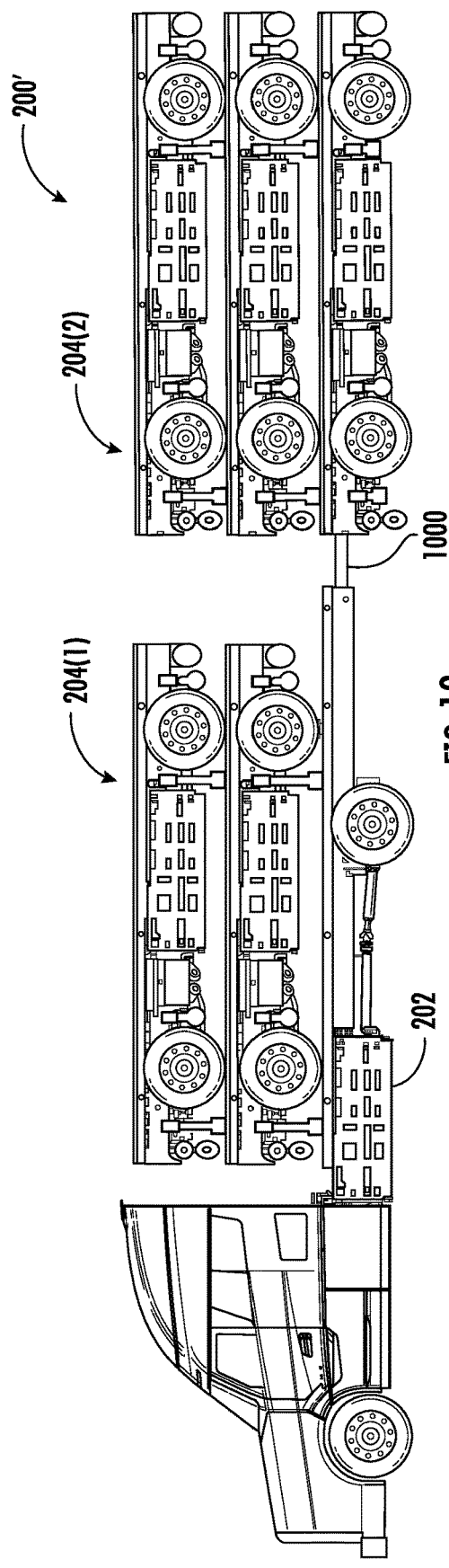
FIG. 10 is a side view of the towing system of FIG. 9A with a first stack of base vehicles engaged with and loaded onto the towing vehicle and a second stack of base vehicles hitched to the towing vehicle.

FIG. 10 is a side view of the towing system of FIG. 9A with a first stack 800(1) of base vehicles 100 engaged with and loaded onto the towing vehicle 202 and a second stack 800(2) of base vehicles 100 hitched to the towing vehicle 202 by a tow bar 1000 attached at a rear of the towing vehicle 202.

Figure 11:
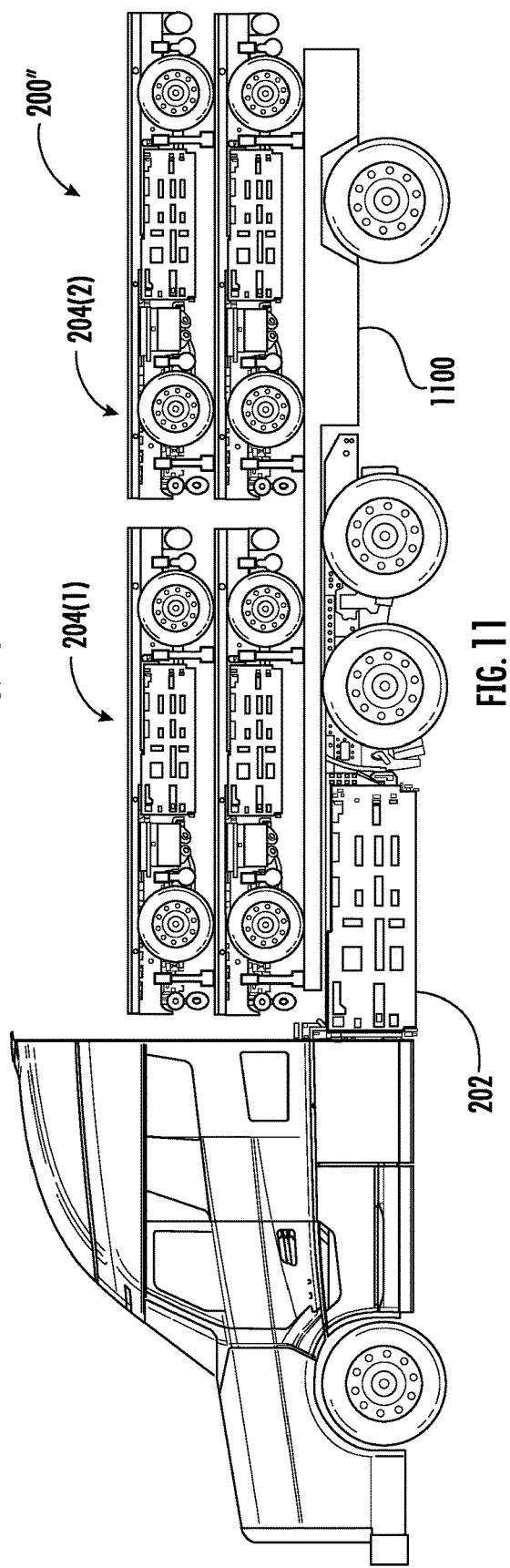
FIG. 11 is a side view of the towing system of FIG. 9A with a tag axle frame to transport two stacks of base vehicles.

FIG. 11 is a side view of the towing system 200 of FIG. 9A with a tag axle frame 1100 to extend the load portion of the towing vehicle 202 to provide sufficient room and support to transport two (or more) stacks 800(1), 800(2) of base vehicles 100.

Those skilled in the art will recognize improvements and modifications to the preferred embodiments of the present disclosure. All such improvements and modifications are considered within the scope of the concepts disclosed herein and the claims that follow.

What is claimed is:

1. A base vehicle, comprising:
   a base vehicle chassis comprising a front axle, a rear axle, and at least one frame rail;
   an upper mount assembly comprising at least one mounting rail attached to a top of the at least one frame rail of the base vehicle chassis; and
   a lower mount assembly comprising at least one mounting bracket attached to a bottom of the base vehicle chassis, the at least one mounting bracket moveable between a retracted position proximate to the at least one frame rail and an extended position distal from the at least one frame rail;
   wherein the at least one mounting rail is configured to receive at least one mounting bracket of an upper vehicle to mount the upper vehicle on top of the base vehicle;
   wherein the at least one mounting bracket is configured to attach to at least one mounting rail of a lower vehicle to mount the base vehicle on top of the lower vehicle; and
   wherein the at least one mounting rail extends along a length of the frame rail between the front axle and the rear axle.

2. The base vehicle of claim 1, wherein the at least one mounting rail is configured to receive a vocational module for mounting on top of the base vehicle, the vocational module comprising at least one of a concrete mixer, concrete pumper, dump body, refuse body, roll-off body, or van body.

3. The base vehicle of claim 1, wherein the at least one mounting rail comprises:
   a Z-rail having an upper portion, a lower portion, and an intermediate portion extending vertically between the upper portion and the lower portion; and
   at least one plate attached to the intermediate portion and an outer surface of the at least one frame rail.

4. The base vehicle of claim 1, wherein the at least one mounting bracket comprises an L-bracket having a horizontal portion and a vertical portion.

5. The base vehicle of claim 1, wherein the lower mount assembly comprises at least one arm subassembly comprising:
   the at least one mounting bracket;
   at least one telescoping arm, the at least one mounting bracket attached to the bottom of the at least one telescoping arm, the at least one telescoping arm configured to move between the retracted position and the extended position.

6. The base vehicle of claim 5, wherein the at least one mounting bracket is pivotably mounted to the at least one telescoping arm.

7. The base vehicle of claim 1, wherein the lower mount assembly comprises at least one body subassembly comprising:
a left-arm subassembly comprising:
a left mounting bracket of the at least one mounting bracket, the left mounting bracket comprising a left L-bracket having a left horizontal portion and a left vertical portion, the left vertical portion comprising a left pinhole;
a left telescoping arm, the left mounting bracket attached to a bottom of the left telescoping arm, the left telescoping arm configured to move between the retracted position and the extended position;
a right-arm subassembly comprising:
a right mounting bracket of the at least one mounting bracket, the right mounting bracket comprising a right L-bracket having a right horizontal portion and a right vertical portion, the right vertical portion comprising a right pinhole;
a right telescoping arm, the right mounting bracket attached to a bottom of the right telescoping arm, the right telescoping arm configured to between the retracted position and the extended position;
a horizontal tube attached to and extending between the left mounting bracket and the right mounting bracket, the horizontal tube comprising a left retractable pin extending through the left pinhole of the left mounting bracket and a right retractable pin extending through the right pinhole of the right mounting bracket.

8. The base vehicle of claim 7, wherein the at least one body subassembly comprises a front-body subassembly positioned rearward of the front axle and a rear body subassembly positioned rearward of the rear axle.

9. The base vehicle of claim 1,
wherein the at least one mounting rail comprises:
a Z-rail having an upper portion, a lower portion, and an intermediate portion extending vertically between the upper portion and the lower portion; and
at least one plate attached to the intermediate portion and an outer surface of the at least one frame rail;
a first plastic pad attached to an upper surface of the upper portion of the Z-rail;
wherein the at least one mounting bracket comprises:
an L-bracket having a horizontal portion and a vertical portion; and
a second plastic pad attached to a lower surface of the horizontal portion of the L-bracket.

10. The base vehicle of claim 1,
wherein the at least one mounting rail comprises:
a Z-rail having an upper portion, a lower portion, and an intermediate portion extending vertically between the upper portion and the lower portion, the intermediate portion comprising at least one pinhole; and
at least one plate attached to the intermediate portion and an outer surface of the at least one frame rail;
wherein the at least one mounting bracket comprises:
an L-bracket having a horizontal portion and a vertical portion;
wherein the vertical portion comprises at least one pinhole.

11. The base vehicle of claim 1, further comprising a plurality of leg assemblies comprising a front set of two leg assemblies and a rear set of two leg assemblies, each leg assembly comprising:
a telescoping leg attached to the base vehicle chassis;
a leg actuator attached to a top of the telescoping leg; and
a wheel attached to a bottom of the telescoping leg,
wherein the leg actuator moves the telescoping leg between
a retracted position, where wheels of the base vehicle contact a ground;
an extended position, where wheels of the base vehicle are lifted off the ground.

12. The base vehicle of claim 11, wherein the front set of two leg assemblies are positioned rearward of the front axle of the base vehicle chassis, and the rear body set of two leg assemblies are positioned rearward of the rear axle of the base vehicle chassis.

13. The base vehicle of claim 1, further comprising at least one winch attached at a rear of the base vehicle chassis, the at least one winch comprising a drum, and a winch cable wrapped around the drum.

14. The base vehicle of claim 13, further comprising at least one pulley configured to receive the winch cable.

15. The base vehicle of claim 1, further comprising:
a left winch attached at a rear of the base vehicle chassis, the left winch comprising a left drum and a left winch cable wrapped around the left drum;
a right winch attached at a rear of the base vehicle chassis, the right winch comprising a right drum and a right winch cable wrapped around the right drum;
a left pulley set comprising a left upper pulley wheel and a left lower pulley wheel; and
a right pulley set comprising a right upper pulley wheel and a right lower pulley wheel.

16. A base vehicle system, comprising:
a plurality of base vehicles, each base vehicle comprising:
a base vehicle chassis comprising a front axle, a rear axle, and at least one frame rail;
an upper mount assembly comprising at least one mounting rail attached to a top of the at least one frame rail of the base vehicle chassis; and
a lower mount assembly comprising at least one mounting bracket attached to a bottom of the base vehicle chassis, the at least one mounting bracket moveable between a retracted position proximate to the at least one frame rail and an extended position distal from the at least one frame rail;
wherein the at least one mounting rail is configured to receive at least one mounting bracket of an upper vehicle to mount the upper vehicle on top of the base vehicle;
wherein the at least one mounting bracket is configured to attach to at least one mounting rail of a lower vehicle to mount the base vehicle on top of the lower vehicle;
wherein the plurality of base vehicles comprises a lower base vehicle and a stacked base vehicle;
wherein the upper mount assembly of the lower base vehicle is removably attached to the lower mount assembly of the stacked base vehicle; and
wherein the at least one mounting rail extends along a length of the frame rail between the front axle and the rear axle.

17. The base vehicle system of claim 16,
wherein the plurality of base vehicles comprises an upper base vehicle;

wherein the upper mount assembly of the stacked base vehicle is removably attached to the lower mount assembly of the upper base vehicle.

18. A towing system, comprising:
   a towing vehicle comprising:
      a towing vehicle chassis comprising at least one frame rail;
      an upper mount assembly comprising at least one mounting rail attached to a top of the at least one frame rail of the towing vehicle chassis;
   at least one base vehicle, each base vehicle comprising:
      a base vehicle chassis comprising a front axle, a rear axle, and at least one frame rail;
      an upper mount assembly comprising at least one mounting rail attached to a top of the at least one frame rail of the base vehicle chassis;
      a lower mount assembly comprising at least one mounting bracket attached to a bottom of the base vehicle chassis, the at least one mounting bracket moveable between a retracted position proximate to the at least one frame rail and an extended position distal from the at least one frame rail;
   wherein the at least one mounting rail of the at least one base vehicle is configured to receive at least one mounting bracket of an upper vehicle to mount the upper vehicle on top of the base vehicle;
   wherein the at least one mounting bracket is configured to attach to at least one mounting rail of a lower vehicle to mount the base vehicle on top of the lower vehicle;
   wherein the at least one base vehicle comprises a lower base vehicle;
   wherein the upper mount assembly of the towing vehicle is removably attached to the lower mount assembly of the lower base vehicle; and
   wherein the at least one mounting rail extends along a length of the frame rail between the front axle and the rear axle.

19. The towing system of claim 18,
   wherein the plurality of base vehicles comprises a stacked base vehicle;
   wherein the upper mount assembly of the lower base vehicle is removably attached to the lower mount assembly of the stacked base vehicle.

20. The towing system of claim 18,
   wherein the at least one base vehicle further comprises a stack of base vehicles, at least one of the base vehicles in the stack of base vehicles attached to a tow bar attached to a rear of the towing vehicle.

* * * * *